Aug. 7, 1951 J. SCHMIDT 2,563,496
APPARATUS FOR FEEDING FILLED CONTAINERS
AND HEADS TO SEAMING MEANS
Filed Nov. 15, 1946 16 Sheets-Sheet 1

Inventor:
John Schmidt,
By Cushman Darby & Cushman
Attorneys

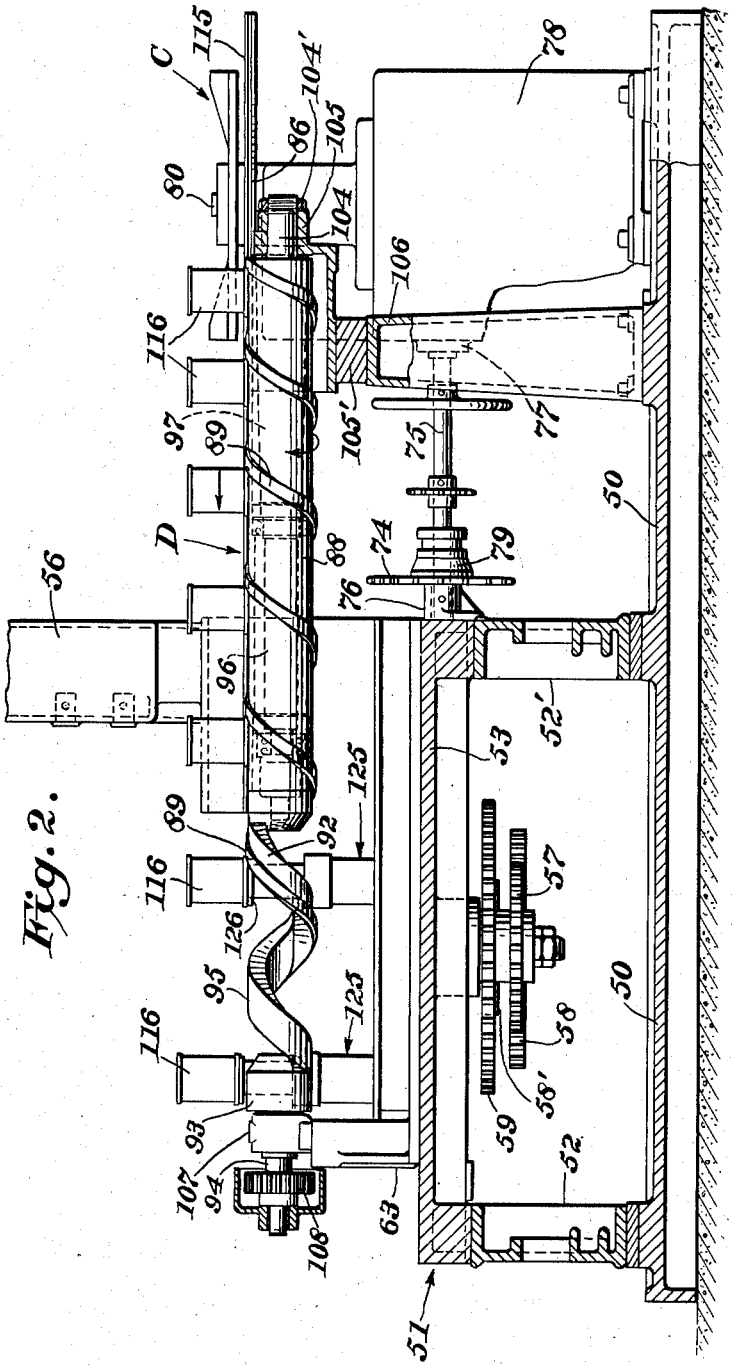

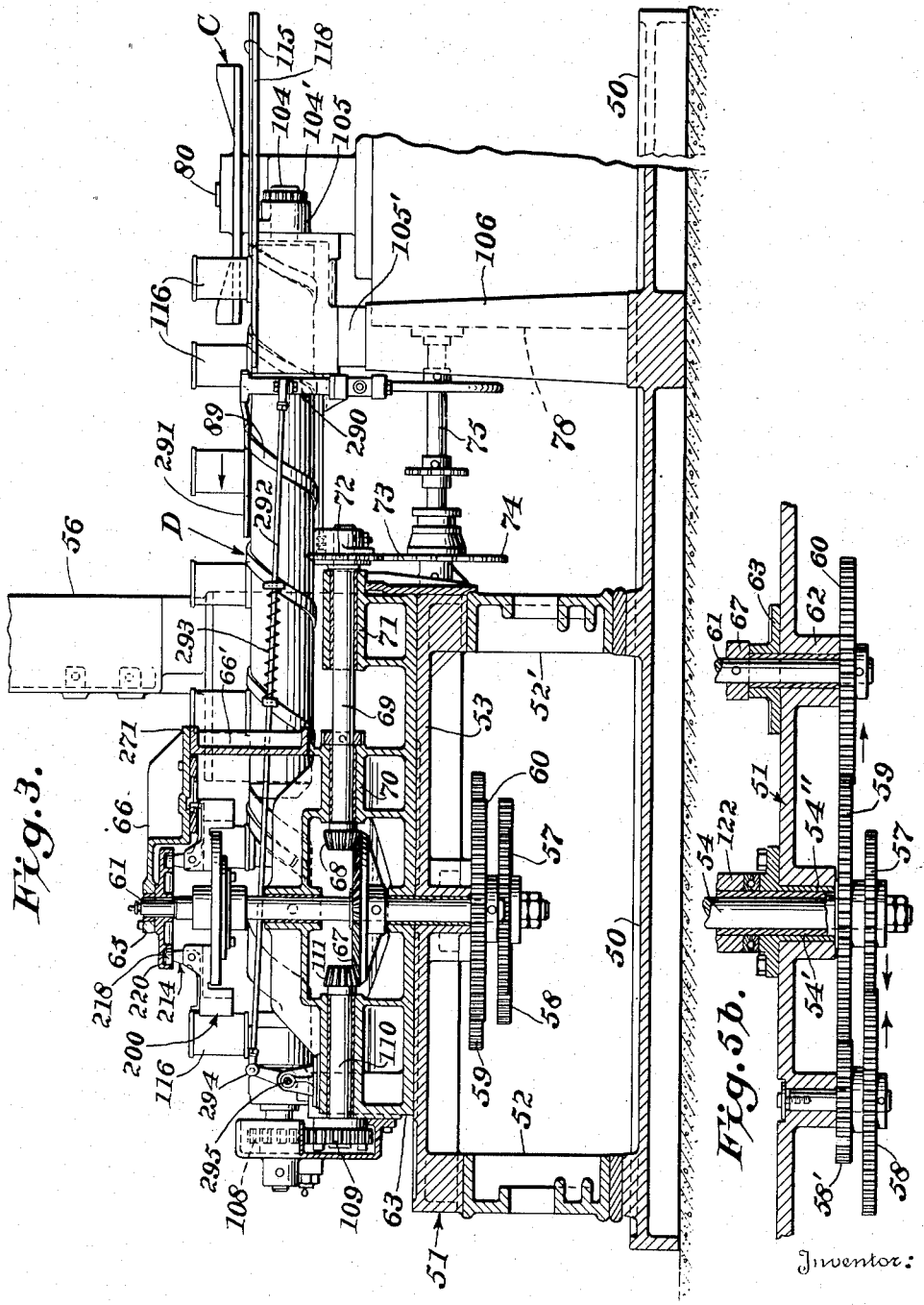

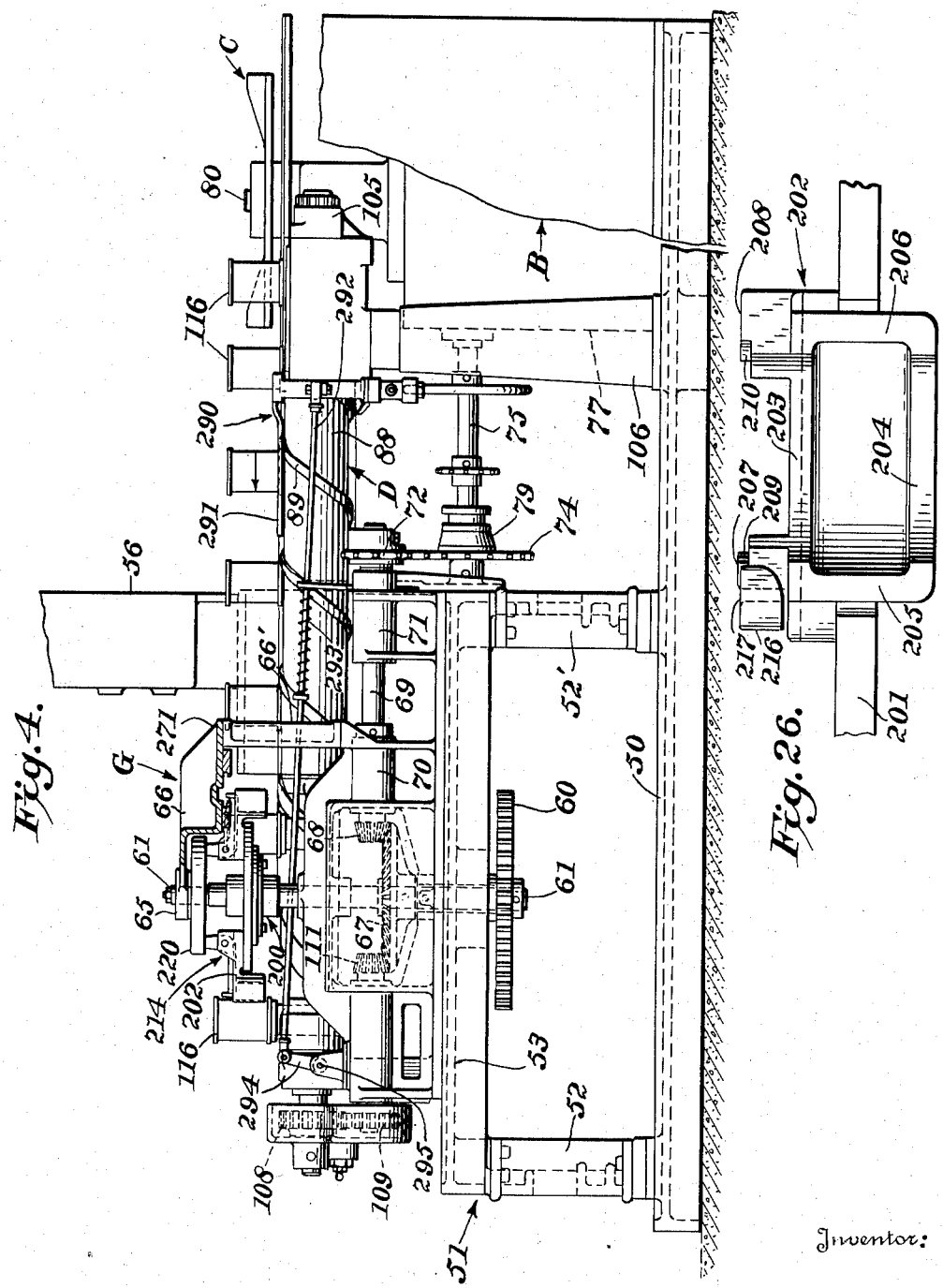

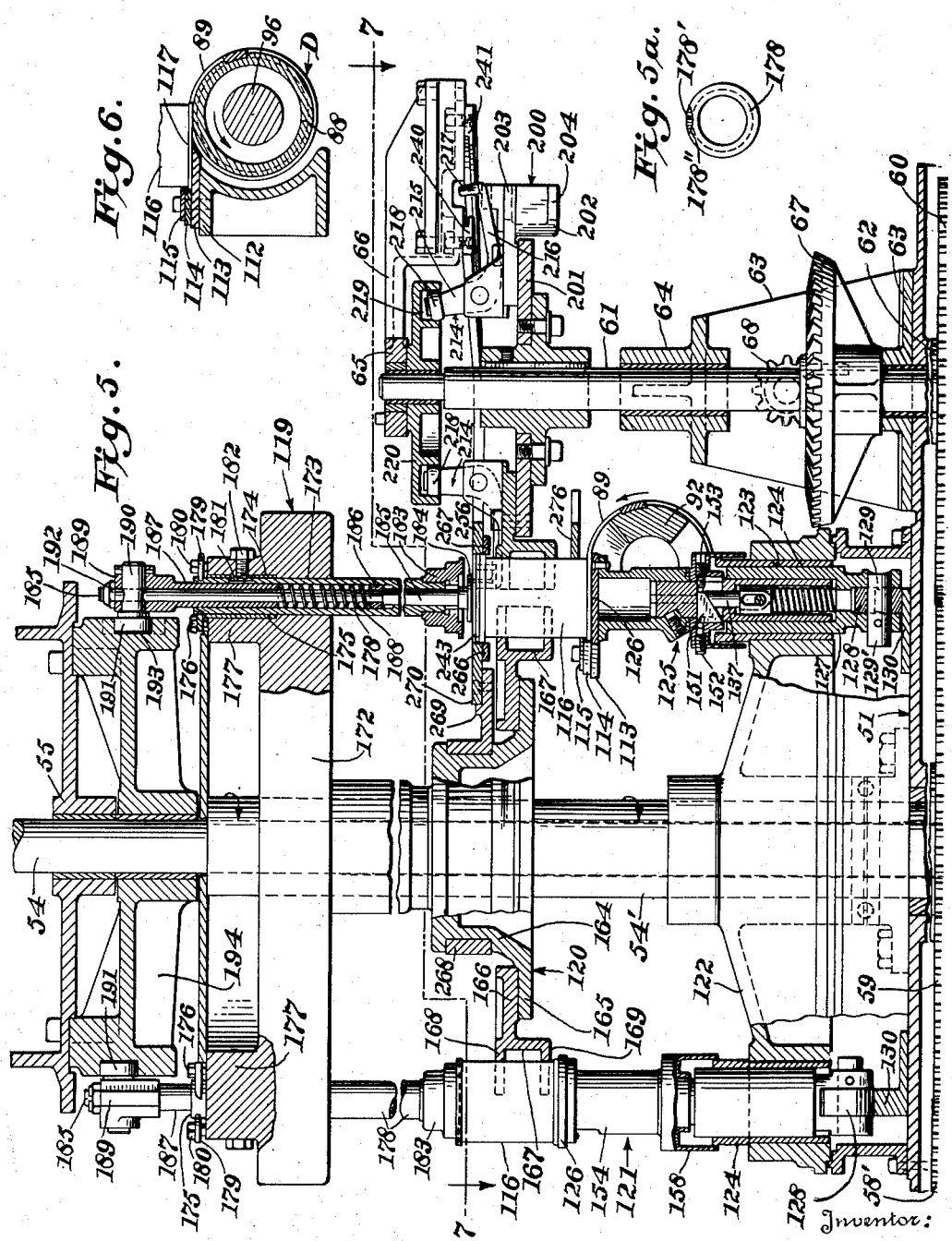

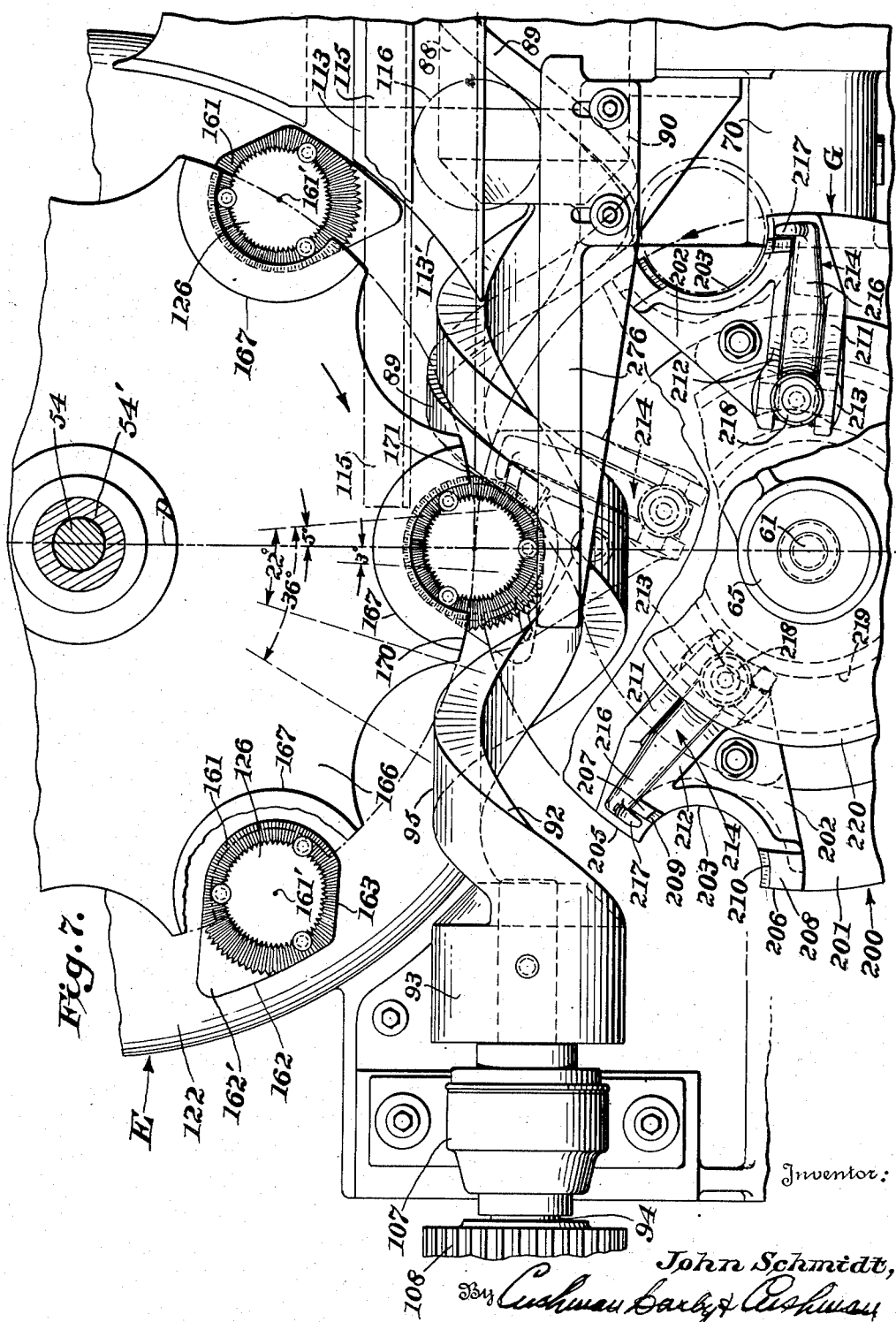

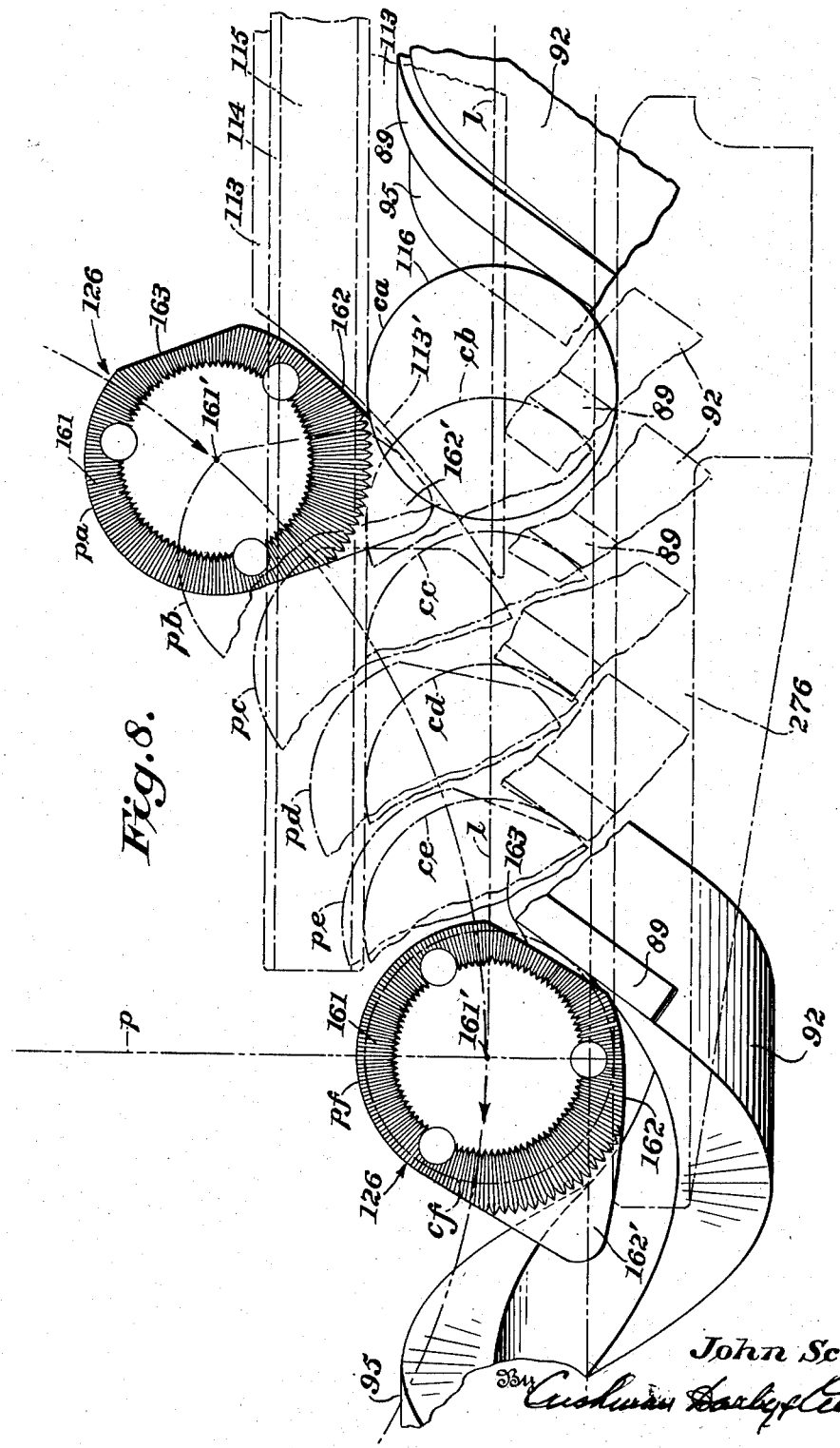

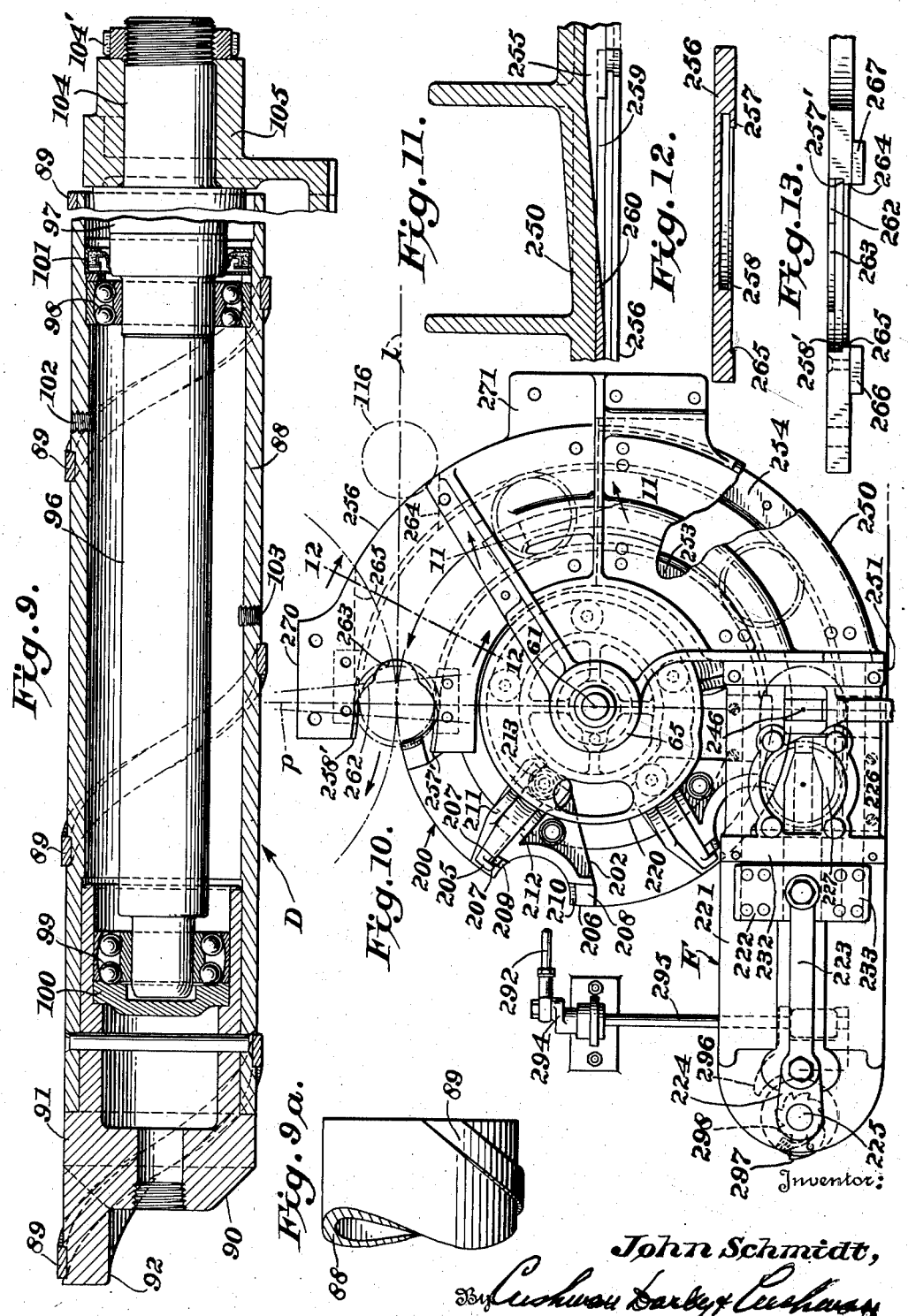

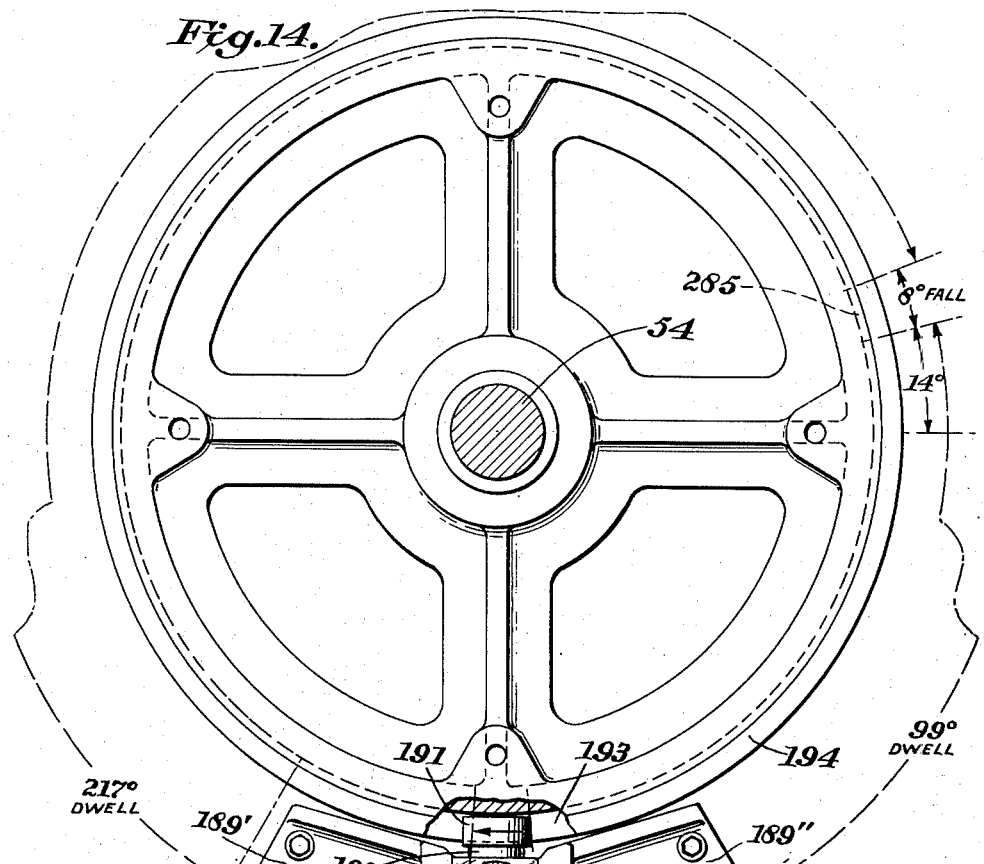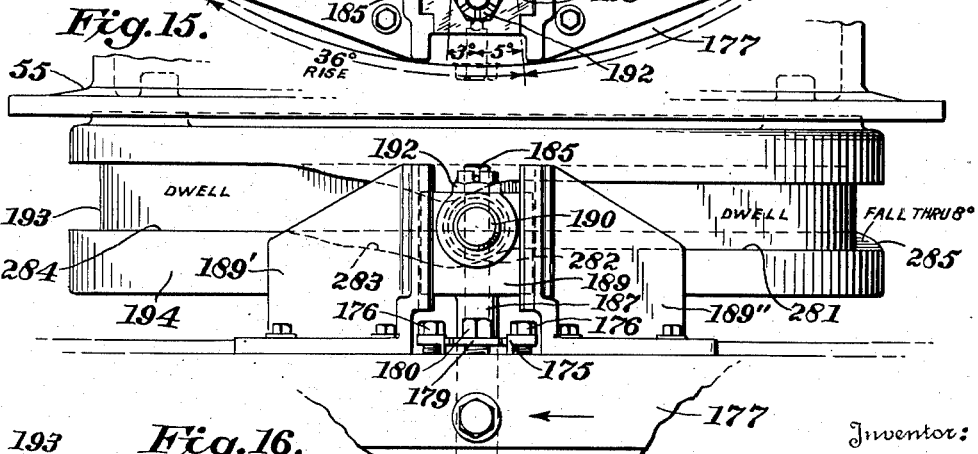

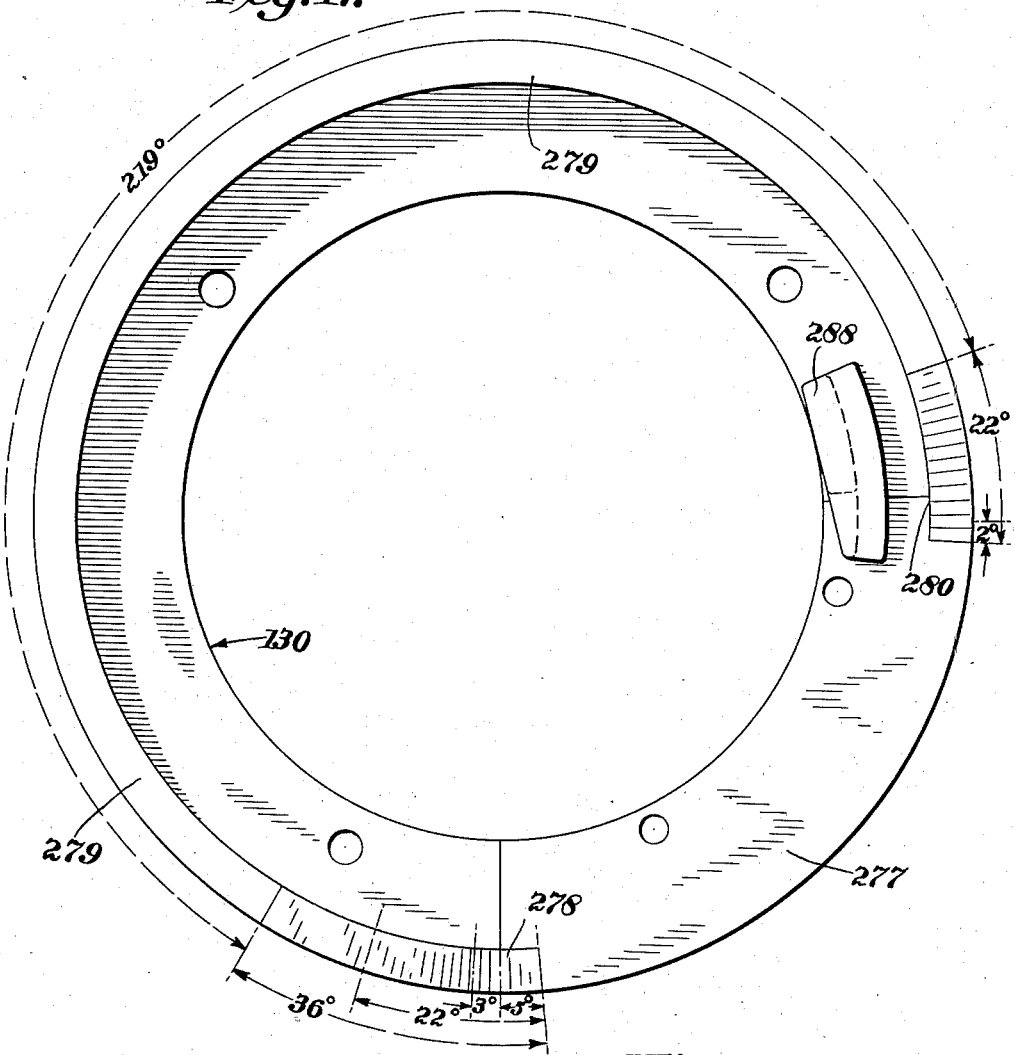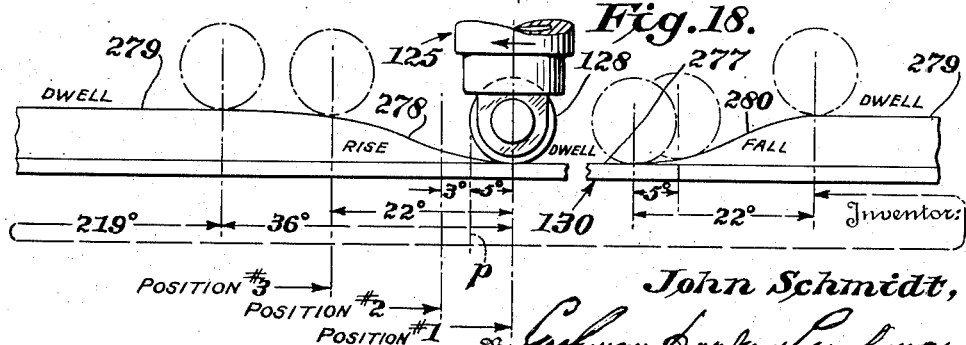

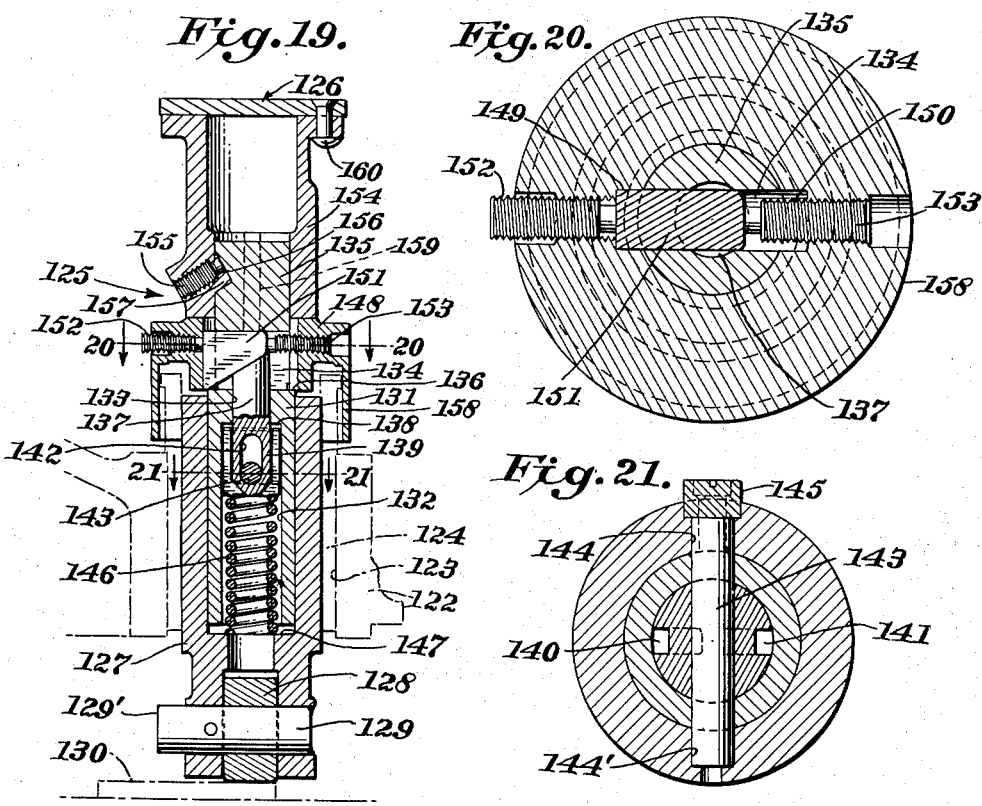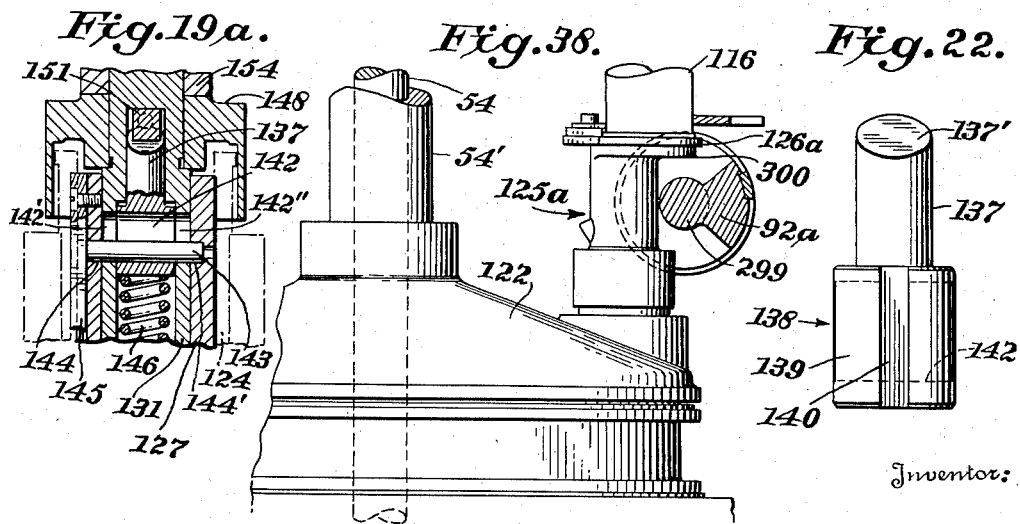

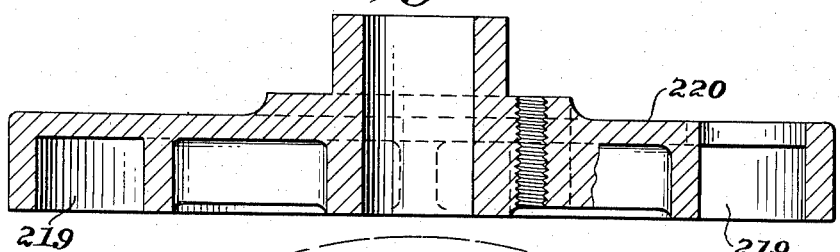
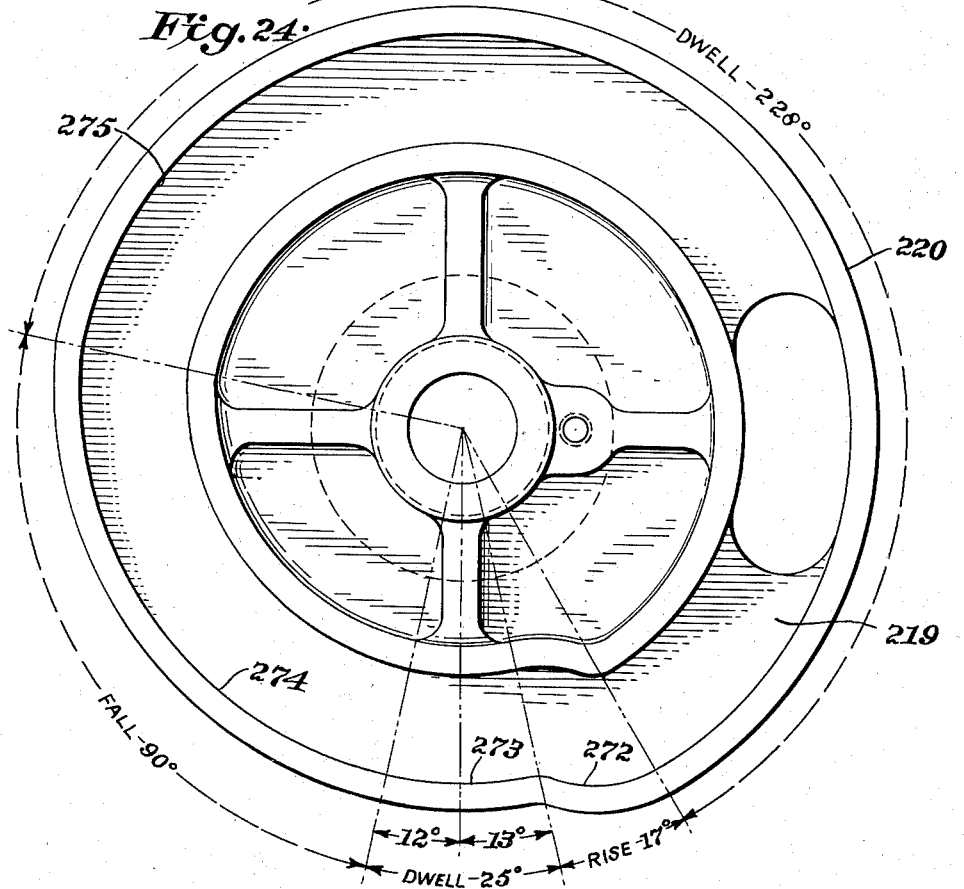
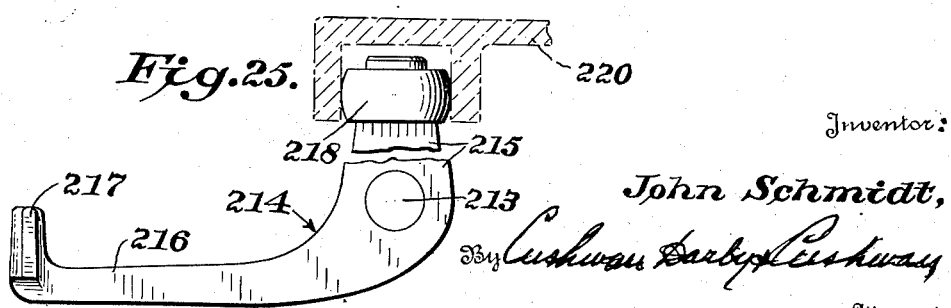

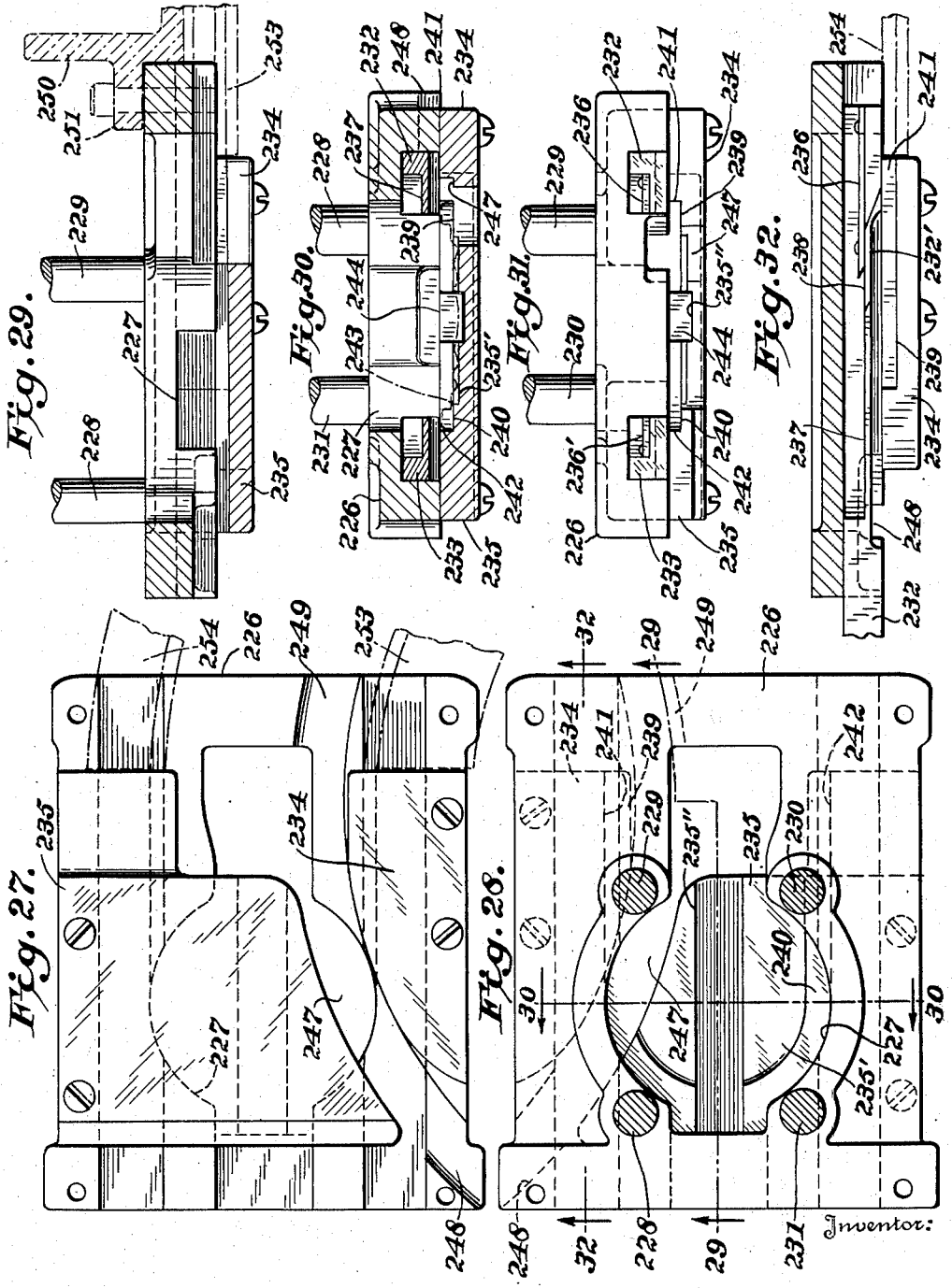

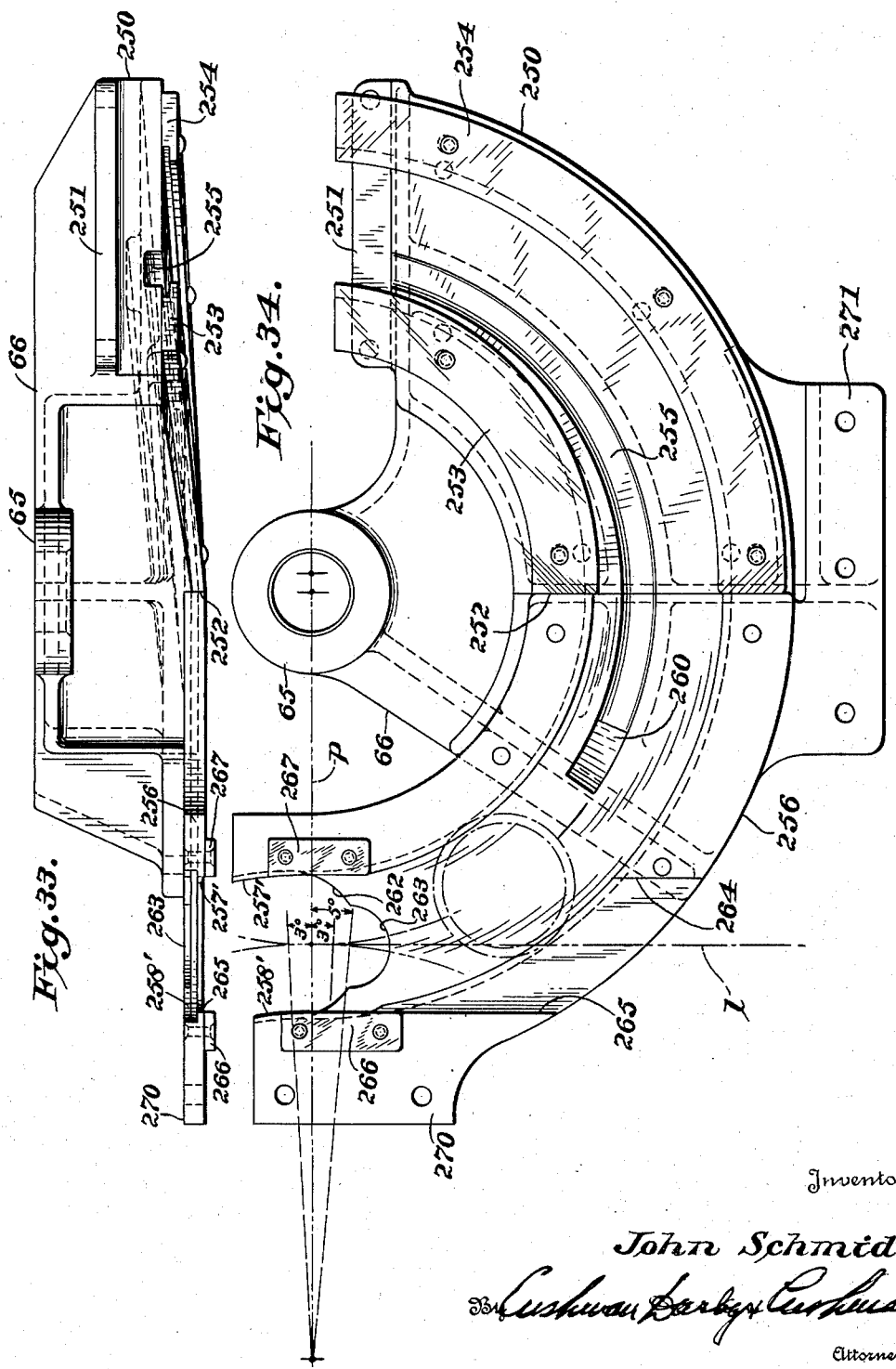

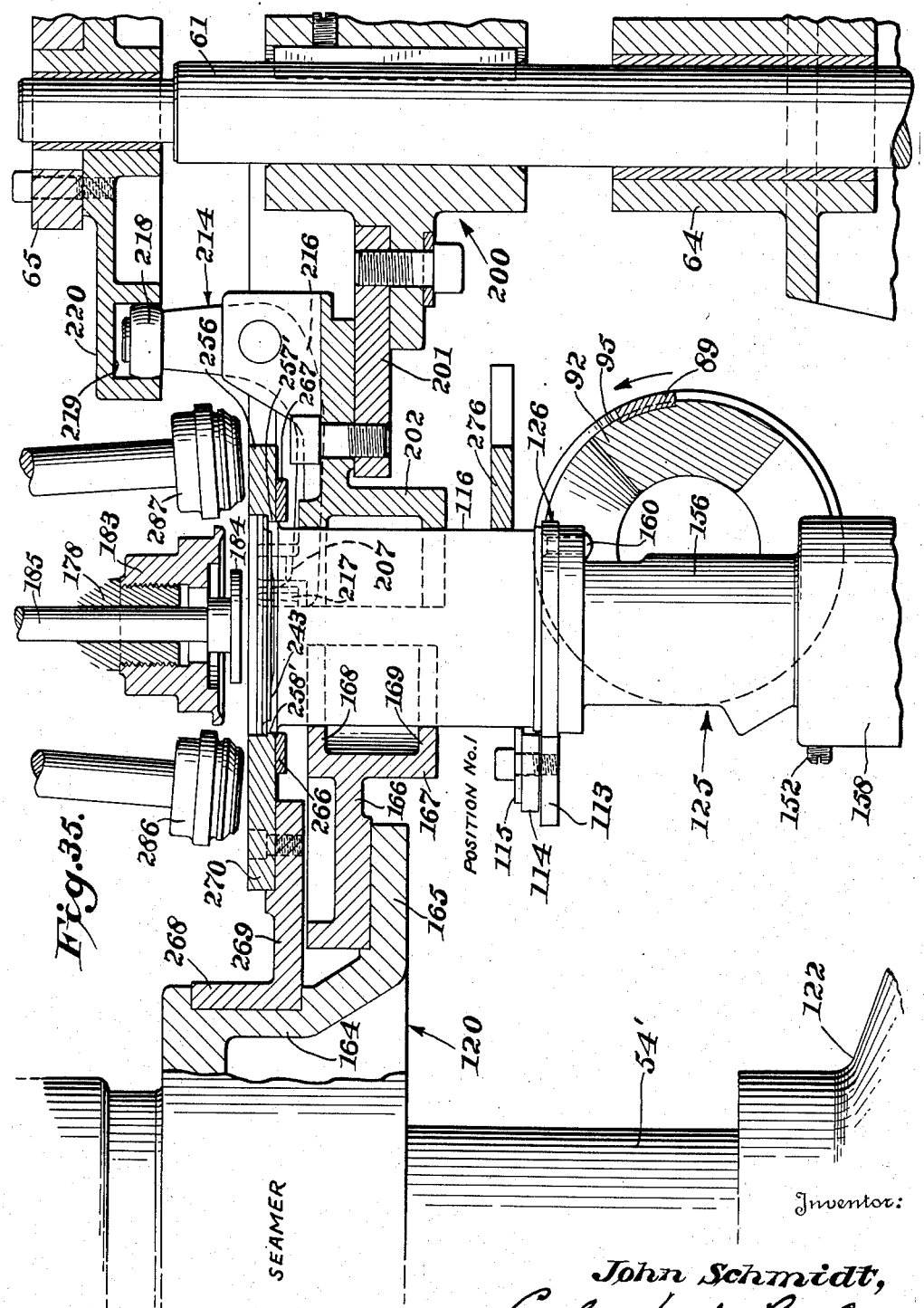

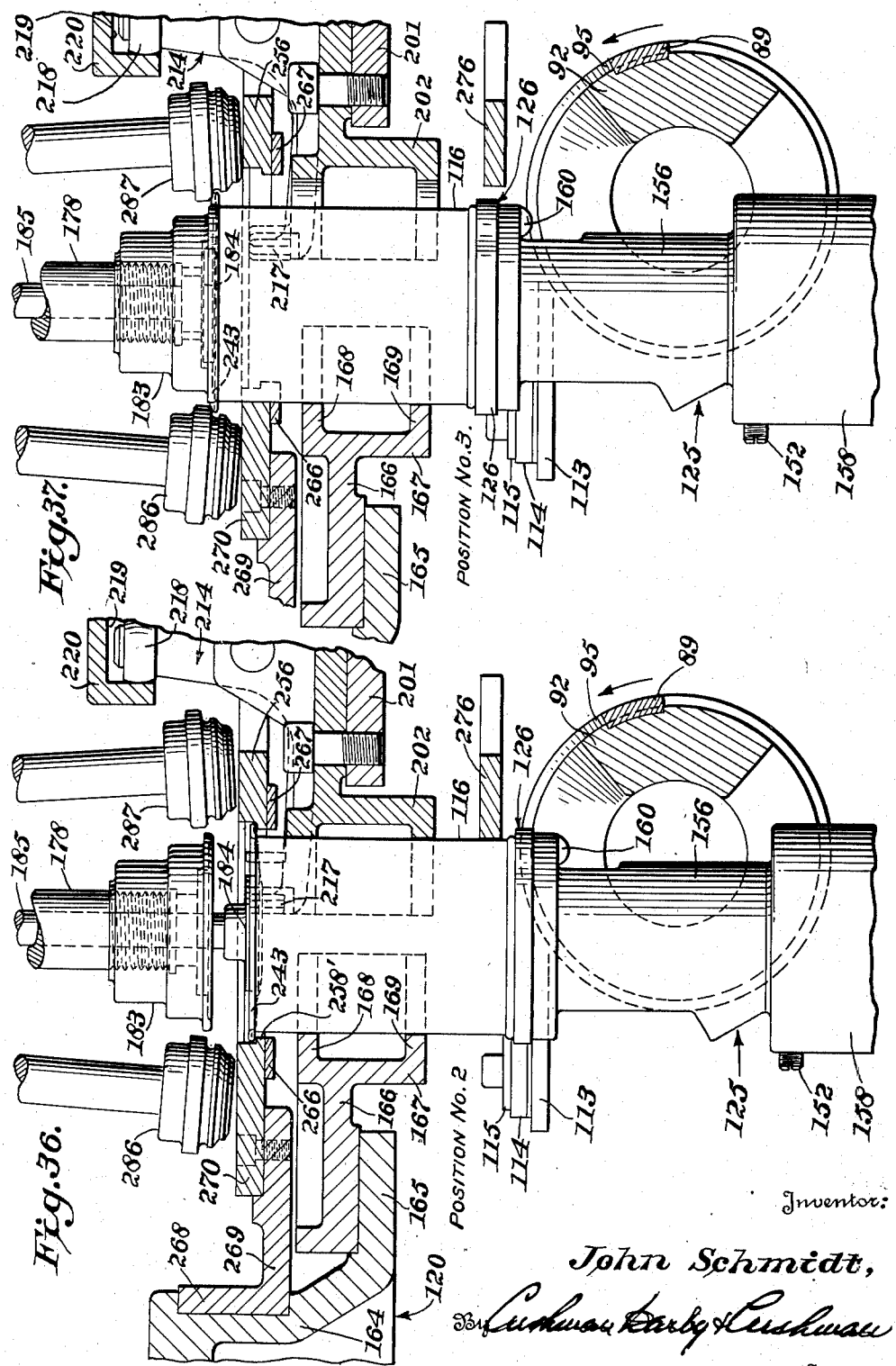

Patented Aug. 7, 1951

2,563,496

UNITED STATES PATENT OFFICE 2,563,496

APPARATUS FOR FEEDING FILLED CONTAINERS AND HEADS TO SEAMING MEANS

John Schmidt, Philadelphia, Pa., assignor to Crown Can Company, Philadelphia, Pa., a corporation of Pennsylvania Application November 15, 1946, Serial No. 710,049

17 Claims. (Cl. 113—14)

This invention relates to method and means for the rapid association of ends or closures with containers and in particular for the application of covers to cans filled with liquids such, for example, as fruit juices which ordinarily suffer considerable spillage between the filling and the closing operations. A principal object of the invention is to provide for the smooth straight line feed of a container substantially tangentially up to and smoothly onto a turret with the immediate application of a closure during a first slight arcuate travel of the container on the turret. Thus, in the case of a filled can, the can when uncovered by the filler head travels rectilinearly to a seaming turret substantially tangentially of the turret and is delivered onto a can support. A can cover disposed in registry above the delivered can is caused to follow the can in continued registry therewith, and in the first few degrees of their concordant travel the two are mutually engaged by relative vertical displacement. Since the turret radius is relatively large and the curvilinear travel together of the can and cover is very short up to the point at which the two are engaged, the tendency to spill due to the inertia of the content's is substanially nil during this travel. The entire travel of the can from the filler to the seamer and on the latter until closed by the cover is, in effect, straight line so that spillage due to directional changes is avoided. The can is, moreover, advanced from the filler to the turret without substantial rotation on its own axis so that spillage due to centrifugal action is avoided.

Among other features of the invention are improved means for feeding the closures into initial and continued registry with the containers, and for bringing the closures and containers together.

In the drawings, wherein the invention is shown embodied in a can filling and seaming machine, by way of example, Figure 1 is a plan view of the machine with parts removed to reveal others, Figure 2 is a section in elevation substantially on line 2—2 of Figure 1, Figure 3 is a section in elevation substantially on line 3—3 of Figure 1, Figure 4 is a front elevation of the machine with parts omitted, Figure 5 is a view partly in elevation and partly in section on the line 5—5 of Figure 1, Figure 5a shows a detail in plan, Figure 5b shows on a smaller scale gearing which appears partially at the bottom of Figure 5, Figure 6 is a section substantially on line 6—6 of Figure 1, Figure 7 is an enlarged partial section substantially on line 7—7 of Figure 5, Figure 8 is a progressive study illustrating the movement of a can onto a seamer turret, Figure 9 is a vertical axial section on an enlarged scale of a portion of a feed screw which extends between the filler and the seamer as shown in Figure 1, Figure 9a is an elevation of the right hand end of the feed screw of Figure 9, Figure 10 is an enlarged plan view of apparatus which appears at the lower left of Figure 1, Figure 11 is an enlarged section substantially on line 11—11 of Figure 10, Figure 12 is an enlarged section substantially on line 12—12 of Figure 10, Figure 13 is an enlarged elevation of the upper portion of Figure 10 as seen from the left of the figure, Figure 14 is an enlarged elevation of a stationary cam which appears in vertical section at the upper left of Figure 5, Figure 15 is an elevation of the cam of Figure 14 as seen from the bottom of that figure, Figure 16 is a diagram showing a portion of the track of the cam of Figures 14 and 15, Figure 17 is a plan view of a cam which appears in vertical section of the lower left of Figure 5, Figure 18 is a diagram showing a portion of the contour of the cam of Figure 17, Figure 19 is a vertical section on an enlarged scale of can supporting means appearing at lower right center, Figure 5, Figure 19a is a partial section taken at right angles to the section of Figure 19, Figure 20 is an enlarged section on line 20—20 of Figure 19, Figure 21 is an enlarged section on line 21—21 of Figure 19, Figure 22 shows a detail of Figure 19 in enlarged elevation, Figure 23 is an enlarged axial section of a fixed cam which appears at the upper right of Figure 5, Figure 24 is a bottom plan view of the cam of Figure 23, Figure 25 is an elevation of a follower for the cam of Figures 23 and 24, Figure 26 is an end elevation of a dial pocket, Figure 27 is a bottom plan view of a cover stack support and guide member, Figure 28 is a top plan view of the same, Figure 29 is a section substantially on line 29—29 of Figure 28, Figure 30 is a section substantially on line 30—30 of Figure 28, Figure 31 is an end elevation of the support and guide member, Figure 32 is a section substantially on line 32—32 of Figure 28, Figure 33 is an end elevation of further cover guide means.

Figure 34 is a bottom plan view of the guide means of Figure 33,

Figure 35 is an enlarged partial section on line 5—5 of Figure 1 showing the parts in a first position, Figure 36 is a view like that of 35 showing the parts in a second position, Figure 37 is a view like that of Figure 35 showing the parts in a third position, and Figure 38 is an elevation, partly in vertical section, of modified can supporting and propelling means.

Figure 1:
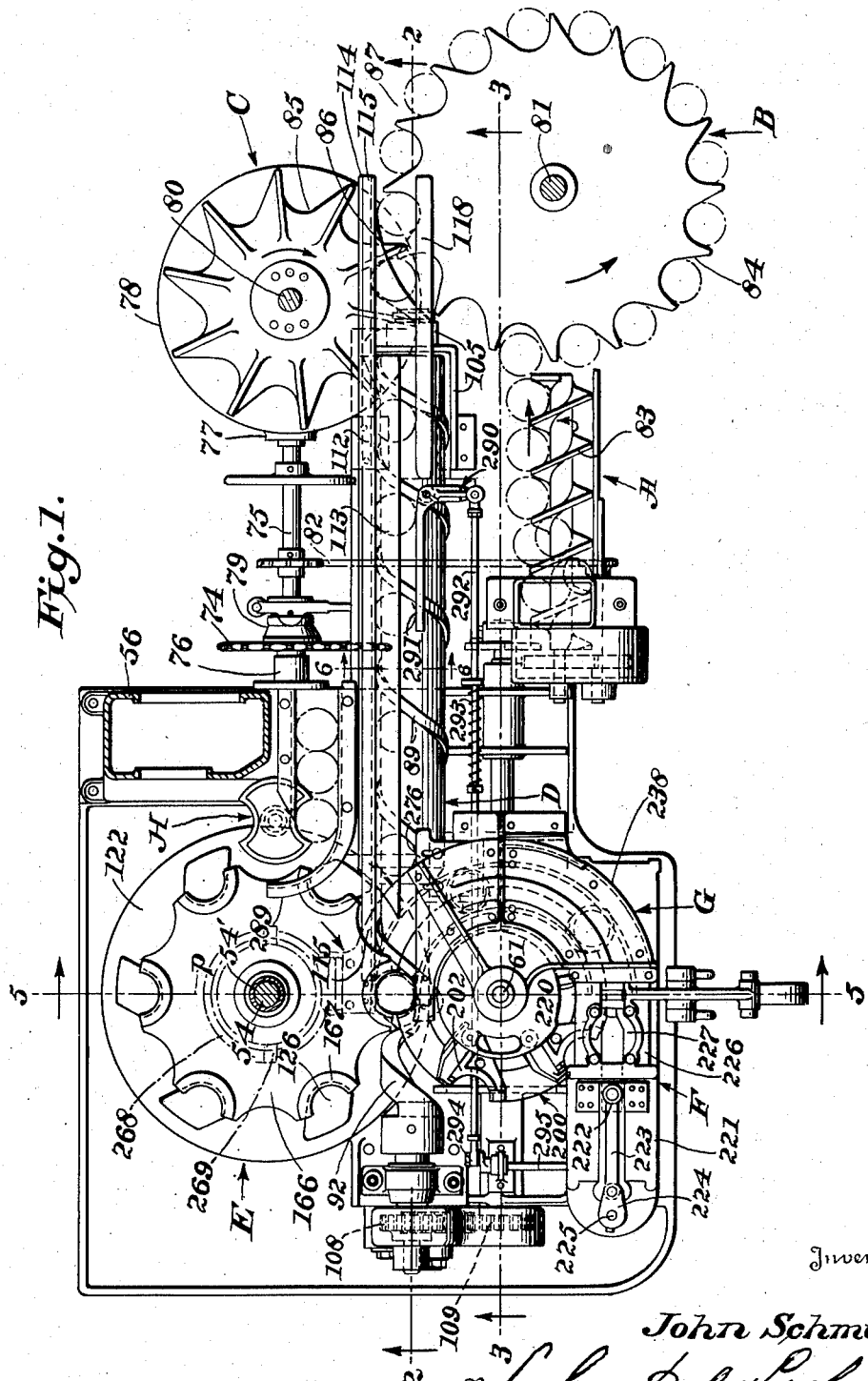

Considering first the general organization, reference letter A designates an infeed conveyor for a filler B with which is associated a dial C operating to transfer filled cans to a feed screw D which delivers to the seamer E. Reference letter F designates a feeder for a stack of covers, the feeder delivering to transfer mechanism G which delivers the covers in timed relation above cans delivered to the seamer by the screw D. Reference letter H designates an outfeed dial associated with the seamer E. The apparatus may be supported on a common bed plate 50 at the left hand end of which is a frame 51 which includes uprights 52 and 52' and a horizontal top plate 53, Figures 1 to 5 and 5b. The seamer includes a vertically supported shaft 54 which is the power input shaft, the shaft being rotatable in a hollow shaft 54' journalled through a bushing 54'' in a lower bearing below top plate 53, the upper end of shaft 54 being journalled in an upper bearing 55 which is fixedly supported from above and conveniently from an overhang, not shown, of a post 56 which rises from the rear right hand corner of frame 51.

Fixed to shaft 54 below plate 53, Figures 5 and 5b, is a gear 57 which, through gears 58 and 58' which are fixed together, drives a gear 59 secured on shaft 54', gear 59 driving a gear 60 fixed on a vertical shaft 61 whose lower end is journalled in a lower bearing 62 of plate 53 through a bushing which extends up into a skeleton gear case 63 fixed on the plate, its intermediate portion in a bearing 64 of the case, and its upper end in a bearing 65 of a bracket 66 which derives support from an upright 66' on the case, Figures 3 and 4. Looking down on the machine, shaft 54' rotates clockwise and shaft 61 counter-clockwise. Fixed on shaft 61 between bearings 62 and 64 is a bevel gear 67 which engages a bevel pinion 68 fixed on one end of a shaft 69 which is journalled in parallel relation to the screw D in a bearing 70 of case 63 and another bearing 71 above plate 53. Fixed on the other end of shaft 69 is a sprocket 72 driving a chain 73 which drives a sprocket 74 free on a shaft 75 which is supported at the rear of the machine in parallel relation to shaft 69 in a bearing 76 on frame 51 and a bearing 77 provided in a fixed housing 78 beneath dial C. Sprocket 74 is adapted to drive shaft 75 through a clutch 79, shaft 75 through suitable gearing driving the dial shaft 80 and the latter, through suitable gearing, driving the shaft 81 of filler B. Through sprockets and a chain 82 shaft 75 drives the screw 83 of the infeed conveyor A. The latter, filler B and dial C are of conventional structure and per se form no part of the present invention. Suffice it to say that the screw 83 delivers unfilled cans successively into the dial pockets 84 of the filler B, these pockets delivering the filled cans successively into the pockets 85 of the dial C for delivery onto a horizontal plate 86 having an arcuate edge which, as most clearly shown in Figure 1, is closely adjacent the can supporting table 87 of the filler B, the top surfaces of the two being flush.

The feed screw D, see particularly Figures 1, 2, 7 and 9, comprises a cylindrical portion or drum 88 constituting a body portion provided with a spiral groove in which is set a radially projecting thread 89. Inserted in the left hand end of the cylinder 88 and rigidly secured thereto is the hollow shank of a hub 90 which has a cylindrical portion 91 flush with the surface of the cylinder 88, and extending from the hub is a skeleton helix 92 which terminates to the left in a hub 93 from which projects an axial journal 94. The helix 92 constitutes a continuation of the body 88 and its outer surface 95 is in the surface of the same cylinder which includes the surface of the body portion 88. The skeleton helix is provided with a peripheral spiral groove in continuation of the groove of drum 88 and receiving the thread 89.

A shaft 96, Figures 2 and 9, has a heavy tapered portion 97 extending a distance within the right hand end of drum 88 to a reduced portion between which and the drum is disposed a ball bearing assembly 98. The inner extremity of the shaft extends within the shank of hub 90 and a ball bearing assembly 99 is engaged between the two. The shank is closed off by a solid oil seal 100, and an oil seal 101 is engaged between the drum and shaft outwardly of bearing 98. Reference numerals 102 and 103 designate plugged oil openings in the drum with the outer ends of the plugs flush with the drum surface. Shaft 96 terminates at the right in a reduced journal portion 104 received in a bearing 105 and locked by a nut 104'. Bearing 105 is secured to a horizontally adjustable spacer block 105' on the upper end of an inverted U-shaped frame 106 secured to the floor plate 50 and supports plate 86 with the top surface of the latter flush with the top line or generatrix of the cylindrical surface of the screw D. Journal portion 94, at the opposite end of the screw, is supported in a bearing 107 secured on top of case 63 and has fixed to its extremity a gear 108 which engages an idler engaging a gear 109 fixed on one end of a shaft 110 journalled in a bearing provided by the case, the other end of the shaft having fixed thereon a bevel pinion 111 which engages gear 67.

Due to the rigid nature of the entire screw structure and of shaft 96, and the multiple bearings provided, the screw is rotatable at high speeds under load without vibration.

Supported by and extending between frames 51 and 106 is a horizontal beam 112 in parallel relation to and rearwardly of screw D, the adjacent face of the beam being concaved as particularly shown in Figure 6. Secured to the top of the beam is a track 113 whose top surface is tangential to the screw body, the track having a rectilinear edge undercut so that the top surface of the track extends close to the surface of thread 89 but free thereof. Secured on top of track 113 in parallel relation to its undercut edge is a spacer strip 114 and secured on top of the strip is a guide rail 115 which overhangs the strip toward the screw in parallel relation to the vertical plane of the latter. As particularly shown in Figure 6, a can 116 is adapted to be supported jointly by the track 113 and the body of the screw with the major portion of the can bottom on the track. The disposition of rail 115 is such that it engages the can body just above the bottom seam 117 and prevents contact of the latter with the strip 114. At the right hand end of the machine, Figure 1, track 113 terminates at the left hand end of plate 86 flush therewith but strip 114 and rail 115 are continued out to the end of the plate. A guide rail 118 is supported on bearing 105 in parallel relation to rail 115, the opposite edges of the two being spaced apart slightly more than the diameter of a can body.

With the machine in operation, the screw is driven in the direction of the arrow, Figure 6, i. e., with its top moving toward the track 113, the dial C, Figure 1, is driven clockwise, and the filler B counter-clockwise. As a can comes between rails 115 and 118, the filler head (not shown) is lifted and the transfer member moves the can rectilinearly along plate 86 as guided by the rails. Thread 89 extends flushly to the right hand end of drum 88, as shown in Figure 9a, and the timing between the screw and dial C is such that as the dial moves the can onto cylinder 88 and track 113 the can is immediately picked up by the entering end of the thread. The advancing effect of the thread at this point is substantially equal to, or slightly greater than, the speed of the can as delivered by the dial and the thread takes behind the can without jar and maintains the continuous travel of the can. The screw picks up one can at each revolution.

Looking down on Figure 1 a can resting on track 113 and urged against rail 115 by the advancing thread 89 tends to be rotated counter-clockwise by the latter and clockwise by the rail. These rotative forces more or less balance each other and due to the friction or drag of the can body on the track 113, which projects under the can toward the screw beyond the center line of the can, the can is advanced substantially without rotation on its axis, especially when driven at high speed, as at 200 or more R. P. M. of the screw. Obviously, this is of great importance since it avoids spilling due to centrifugal action. The line of travel of the can centers is indicated at l.

The seamer E, see Figure 5 in particular, comprises an upper turret 119, a dial 120, and a lower turret 121, all fixed to shaft 54'. The lower turret comprises a table or casing 122 including a hub 122' supported through a ball bearing assembly on bushing 122'. The table is provided with a concentric circular series of vertical bores 123 in equally spaced relation, there being six in the present instance. A bushing 124 is secured in each bore, as by a press fit, and guides for vertical reciprocation a chuck comprising a pedestal 125 to the upper end of which is fixed a supporting pad or base plate 126 for a can 116.

Referring also to Figures 19 to 22, a sleeve 127 is splined in bushing 124 for vertical reciprocation and has a lower bifurcated end which receives a roller 128 mounted on an axle 129 which is radial to the turret axis and has an inwardly projecting portion 129', the roller riding on a cam track 130. Vertically slidable in sleeve 127 is the lower end of a plunger 131 having a lower axial bore 132 surmounted by a counter-bore 133 which extends upwardly into a diametrical slot 134, the plunger having a somewhat reduced portion 135 which extends upwardly from the lower level of the slot 134 so that an upwardly faced shoulder 136 is provided. Slidable in counter-bore 133 is the shank 137 of a follower 138 which has a head portion 139 slidable in the upper end of bore 132, the head having longitudinally extending grooves 140 and 141 for the prevention of suction effects thereabove. The head has an axially extending elongated slot 142 and plunger 131 has similarly shaped slots 142' and 142" in which is engaged a stop pin 143 whose ends are received in mating circular openings 144 and 144' in the walls of sleeve 127 as particularly shown in Figures 19a and 21. Pin 143 is retained by an end wall of opening 144' and by the spline 145 which closes opening 144. A compression spring 146 seats at its lower end on a shoulder 147 within and adjacent the lower end of sleeve 127 and at its upper end against head 139 so that, as shown in Figure 19, the bottom of slots 142, 142' and 142" engage the pin 143.

Surrounding the lower portion of the reduced section 135 is a collar 148 which has recesses 149 and 150 in register with the ends of slot 134 and in the slot is a slide 151 having a bottom inclined surface engaging a mating inclined surface 137' at the top of stem 137, the horizontal top surface of the slide being slidable along the horizontal top wall of slot 134. The ends of member 151 are engaged by set screws 152 and 153 threaded in diametrically opposed openings of collar 148.

Engaging the upper end of the reduced section 135 is a tubular member 154 which supports pad 126. Threaded in a somewhat upwardly directed threaded bore in member 154 is a set screw 155 which engages rectangularly a face 156 of a notch 157 formed in portion 135. When screw 155 is tightened, member 154 is forced downwardly to clamp collar 148 between it and the shoulder 136. The collar includes a depending skirt 158 which telescopes over the upper end of bushing 124 to provide a guard.

In Figure 19, slide 151 is in a fully retracted position in which it is against the end wall of groove 149 which groove and groove 150 are provided merely for the purpose of extending the range of travel of the slide. The slide is locked in position by the set screws 152 and 153 and spring 146 is at maximum expansion due to the engagement of the bottom of slot 142 with the stop pin 143. Plunger 131 can thus be moved downwardly with respect to sleeve 127 against a certain spring pressure but outward movement is positively limited by pin 143 as engaged by the bottoms of slots 142' and 142". Should it be desired to increase the spring pressure, screw 153 it threaded out to the necessary extent and screw 152 is threaded in to displace slide 151 into abutment with screw 153, this displacement acting to wedge the follower 138 downwardly relative to plunger 131 and so increasing the compression of the spring. This is accomplished without disturbing the normal height of the pedestal. A key 159 fixes the angular relation of collar 148 and member 154 with respect to the plunger and pin 143 prevents rotation of plunger 131 relative to sleeve 127. Since a spline is provided between the latter and bushing 124 which is fixed in the bore 123, no rotation of the pedestal about its axis is possible so that pad 126 maintains a fixed position with respect to the pedestal axis, the pad being secured to the top of member 154 by means of a plurality of rivets 160.

As shown in Figures 5 and 35, for example, the upper portion of pedestal 125 is received between convolutions of the helix 92. It will be noted that only a slight space exists between the pedestal and the axis of the helix and for this reason the latter is of skeleton form in order to be able to clear the pedestal. In Figures 5 and 35, the pedestal is in its lowermost position and the horizontal top surface of the pad is in a plane tangent to the top of the cylindrical surface of the helix which means also that the top of the pad is coplanar with the top of track 113.

A pad 126 is shown in full outline at the left of Figure 7 and in Figure 8. It will be observed that the top of the pad is provided with a circular series 161 of radial corrugations formed about a center 161' which is on the vertical axis of the supporting pedestal. These corrugations are made by gouging grooves into the otherwise flat surface of the pad so that the supporting surface of the pad is still flat in effect. When a can is centered on the pad, i. e., is supported on the pad on the center 161', the bottom edge of the can will be on the corrugations which will oppose rotation of the can relative to the pedestal.

The outer edge 162 of the pad is arcuate on the turret axis and the pad has a forwardly extending blunt triangular tongue or extension 162'. Rearwardly edge 162 terminates in an edge 163 which is secantial to the otherwise generally circular contour of the pad. In the rotation of the turret, the arcuate edge 162 passes in close proximity to a similarly arcuate edge 113' at the foot end of track 113, Figure 7.

Dial 120 comprises a central inverted bowl-like portion 164 terminating in an outwardly directed horizontal flange 165 to the top of which is secured a coaxial ring 166. Ring 166 is provided on its periphery with a number of pockets 167 equal in number to the number of pads 126 and respectively registered thereabove, the pockets having top and bottom flanges 168 and 169 which are arcuate on the vertical lines of the respective pad centers 161' and have a radius very slightly greater than that of the can body, the pockets being symmetrical with respect to radii of the dial. The outer edges 170 and 171 of the pockets are arcuate on a radius of the turret, the length of the radius being the distance between the axis of shaft 54 and the vertical line of the associated pad center. No part of ring 166 projects outwardly beyond the circle which includes the arcs 170 and 171.

The upper turret 119 comprises a table 172 provided with vertical bores as at 173, Figures 5, 14 and 15, which are coaxial with the respective centers 161' each bore having an upward enlargement 174 receiving a bushing 175 having at the inner side of its upper end a flange provided with perforations receiving retaining cap screws 176 threaded into an anular rib 177 on the main body of the table and through which the bore extends. Slidable in bore 173 and bushing 175 is a sleeve 178 which, at its upper end, is provided with a peripheral groove 178', see also Figure 5a, in which is engaged an annular flange 179 integral with a cap screw 180 which is threaded into the top of rib 177 in parallel relation to the sleeve. The top wall of the anular recess is broken away at 178'', Figure 5a, to provide clearance so that, in assembly, the sleeve can be pushed upwardly to bring the groove into the plane of flange 179, the sleeve being then turned so that flange 179 is within the groove. When so turned, a vertical slot 181 formed in the sleeve is engageable by the inner end of a cap screw 182 which is threaded radially in rib 177 and through an opening provided in bushing 175. It will thus be evident that by turning screw 180, sleeve 178 can be appropriately adjusted vertically, the sleeve being otherwise held by flange 179 against any vertical displacement. Turning of the sleeve is prevented by screw 182.

Threaded on the lower end of sleeve 178 with its lower surface substantially above the top of the underlying pocket, is a chuck 183 which has a lower recess adapted to receive a circular pressure pad 184. Pad 184 is fixed to the lower end of a rod 185 which has a sliding fit within the lower portion of the sleeve. Upwardly sleeve 178 is internally enlarged and slidingly receives a stop collar 186 which rests on a shoulder at the lower end of an upwardly reduced portion of the rod which extends upwardly through a sleeve 187 slidable in the upper portion of sleeve 178, a compression spring 188 being interposed between collar 186 and the lower end of sleeve 187. At the upper end of sleeve 187 is a slide 189 guided for vertical movement by brackets 189' and 189'' fixed on rib 177 and having a bore radial with respect to shaft 54 and receiving a pin 190 on the inwardly projecting end of which is mounted a roller 191. Rod 185 extends diametrically and slidably through the pin 190 and out through a bore at the top of slide 189 to have threaded thereon a nut 192. Roller 191 is engaged in the track 193 of a stationary cam 194 which is fixed to the bearing 55 therebeneath. It will be evident that downward movement of sleeve 187 will be yieldingly imparted to pad 184 through the spring 188 and that the pad can move upwardly relative to the sleeve due to the slidability of rod 185 therein. Normal relationship of rod 185 and sleeve 187 is determined by the adjustment of nut 192.

Secured on shaft 61 above bearing 64, Figures 5, 10 and 26 to 28 is a dial 200 which comprises a table 201 having secured around its periphery a number of equally spaced pocket brackets 202, the number in this instance being five and their peripheral spacing being the same as that of pockets 167 around dial 120. Referring to Figures 7, 10 and 26, each pocket has top and bottom arcuate flanges 203 and 204 in the planes respectively of the flanges 168 and 169 of pockets 167 and the curvature of the flanges is the same. Shafts 54' and 61 are disposed with their axes in a vertical plane p which is perpendicular to the axis of screw D and the outer edges 205 and 206 of the pockets are in a circle substantially tangent to the circle of travel of the outer edges 170 and 171 of the pockets 167. The drive ratio between gears 59 and 60 is such that the pockets of the two dials successively come into symmetrically opposed relation in the plane p.

Each pocket 202 has at its upper outer portion bosses 207 and 208 which are respectively arcuately rabbetted to provide arcuate faces 209 and 210 on the same center as the pocket but on a radius slightly greater than that of the can cover. At its trailing edge, each bracket 202 is provided with a radial channel defined between side walls 211 and 212 of which the latter terminates at the boss 207, and pivoted in the channel on a bolt 213 is a bell crank lever 214 comprising arms 215 and 216 of which the latter is normally disposed horizontally in the channel and has a forwardly directed upwardly extending nose 217 lying outwardly of boss 207 and inwardly of edge 205, the forward edge of the nose being substantially tangential to the circle of seat portions 209 and 210. Arms 215 are equipped with rollers 218 which are received in a cam track 219 of a disc 220 which is fixed beneath bearing 65. The purpose of the pivoted members 214 is to propel covers, in a manner to be later described, from the feeder F to a position above cans delivered to the pads 126.

The feeder F comprises a base 221 along which is reciprocable a slide 222 driven through a link 223 from a crank 224 on a vertical shaft 225 driven in any suitable manner in timed relation with the dial 200, preferably from shaft 61. Fixed to base 221 and projecting to the right thereof, Figures 1, 10, and 27 to 33, is a plate 226 which has an opening 227 slightly larger than the diameter of the can top and four upright posts 228 to 231 are provided around the opening for the lateral support of a stack of covers in the usual manner.

Secured to slide 222 is a pair of parallel separating knives 232 and 233 guided in grooves on the underside of plate 226 with their opposed edges slightly secantial to opening 227 below the top thereof, the knives being supported on plates 234 and 235 secured beneath plate 226, Figures 27 to 32. Knives 232, 233 are substantial duplicates and knife 232 is shown in inside elevation in Figure 32. Referring to this figure and Figures 30 and 31, a blade 236 is fixed on top of a depressed horizontally extending ledge 237 of knife 232 with its rear edge projecting above a cut out 238 and a similar blade 236' is fixed on a similar ledge of knife 233. With the slide retracted, that is, with crank 224 at 180° from the position of Figure 10, the stack rests on blades 236 and 236'. When the slide is advanced, the stack drops onto the ledges 237 and 237'. When the slide is again retracted, the blades 236 and 236' act to slice the lowermost cover from the stack and this drops onto a track provided by plates 234 and 235, this track comprising horizontal surfaces 239 and 240 and parallel vertical walls 241 and 242 spaced apart slightly more than the diameter of the cover 243, Figure 30, plate 235 being relieved at 235' for the reception of the central bulge of the cover. When the slide now goes forward, a pusher 244 secured thereto and guided in a groove 235'' on top of plate 235 engages the separated cover and pushes it into centered relation with a marker 245 so that the cover is centered on a vertical line passing through the point 246, Figure 10.

Plates 234 and 235 have opposed arcuate edges defining a curved path 247 whose curve is on the center of shaft 61 and whose radius and width are such as to be able to pass the nose 217 of the driving member 216, and at the ends of passage 247, the bottom of plate 226 is provided with arcuate grooves 248 and 249 for the same purpose.

Bracket 66 includes an arcuate plate 250 having an end flange 251, Figures 10, 33 and 34 above and secured to right hand end of plate 226, and from this flange the bottom of plate 250 slopes downwardly counter-clockwise, Figure 10 to a radial shoulder 252 which, as here shown, is 90° from the vertical plane p. Secured beneath the inclined bottom of the plate are parallel arcuate rails 253 and 254 whose opposed sides are rabbetted to provide a track in continuation of the track afforded by the plates 234 and 235, this track being arcuate generally on the center of shaft 61. Between rails 253 and 254, plate 250 is provided with an arcuate tunnel 255 above the circle of travel of nose 217.

Beyond shoulder 252, the lower surface of plate 250 is horizontal and secured thereto and in abutment with the shoulder is an arcuate plate 256 which is arcuately relieved on its underside and undercut to provide ledges 257 and 258, Figure 12, which form a track in continuation of that provided by rails 253 and 254. The end of plate 256 adjacent shoulder 252 is arcuately slotted at 259, Figures 11 and 34, and the top of tunnel 255 inclines downwardly above this slot, the inclination being continued beneath the top wall of plate 256 at 260. The track provided by the ledges 257 and 258 is arcuate on the center of shaft 61 around to the vertical plane p. The top of plate 256 is arcuately cut away at 262 in advance of the plane p, Figure 10, and is further centrally and arcuately cut away at 263 on a diameter slightly greater than that of the knockout pad 184. Beyond the plane p, short continuations 257' and 258' of ledges 257 and 258 have the same spacing but are arcuate on the center of shaft 54' and these ledge portions are upwardly unobstructed. The underside of plate 256 is relieved to provide a shallow channel having side walls 264 and 265, Figures 10, 11, 13 and 34, which are spaced apart slightly more than the diameter of the can top and are symmetrical with respect to the line l of movement of the center of cans propelled by the screw D, this line, as particularly shown, in Figure 10, intersecting the plane p midway between the cover supporting ledges of plate 256. Secured beneath and running along ledges 257' and 258' are bars 266 and 267, Figures 5 and 35 to 37 which are provided merely for the purpose of giving depth to the ledges.

Referring to Figure 5, portion 164 of dial 120 is provided with a circumferential groove in which is received a split ring 268 having an extension 269 to which is secured an extension 270 of plate 256 for the support of the outer end of the latter, the dial rotating freely relative to the ring. The support of bracket 66 on upright 66', Figures 3 and 4, is through a flange 271 which projects radially from the arcuate plate portion 250.

Referring to Figures 23 to 25, the cam track 219 has a rise 272 adjacent the cover stack and, in the present instance, beginning 30° in advance of the plane p. Beyond the plane p, the track has a 12° dwell 273 followed by a fall 274 of 90° terminating in a dwell 275 which extends 228 degrees around to the start of the rise 272. The height disposition of the nose 217 is such relative to plates 226, 250 and 256 that when the roller 218 traverses the rise 272, the nose will be elevated and will pass along the arcuate clearances beneath plate 226 to engage a cover which has been fed to the marking station and marked. At this time, the cover parting mechanism is retracted or substantially so so that an upwardly relieved portion 232', Figure 32, of bar 232 is between passage 247 and groove 248 to provide clearance for the nose. As the cover moves along between the inclined rails 253 and 254, the fall 274 of the cam track causes the nose to drop appropriately, still in propelling relation to the cover, and when the latter enters the horizontal track provided by plate 256, the cover has been lowered sufficiently so as to be between the faces 209 and 210 of boss portions 207 and 208. The terminal inclined portion of the top of tunnel 255 and the adjacent continuing inclined portion 260 of plate 256 insure the lowering of nose 217 and when the roller 218 enters the dwell 275, the nose is in normal lowered position, still in propelling relation to the cover which is still between faces 209 and 210, and the cover eventually reaches a point at which its center is in register with the point of intersection of line 1 with plane p.

It has been previously explained how a filled can is propelled by the thread 89 while supported by the screw body and by the track 113 and guided by the rail 115. At its entering or right-hand end, the advance of the thread is such that the cans are successively smoothly picked up in spaced relation. In the present instance, the pitch of thread 89 increases throughout the length of drum 88 and becomes uniform on the helix 92 with the result that the travel of the cans is accelerated along drum 88 and that upon reaching the helix, the speed of the can is the same as the peripheral speed of the turret 122, i. e., of the pads 126, with the cans spaced apart the same as the pads 126 and the pockets of dials 120 and 200. As the cans move onto the helix, their bottom support is reduced since they are on a relatively narrow portion of the helix in advance of the thread. Consequently, in order to steady the cans, I may provide a guide rail 276, Figures 1, 5, 7, 8 and 35 to 37 supported from bearing 70 in parallel relation to rail 115 but spaced thereabove. As shown in Figures 7 and 8, rail 115 terminates somewhat short of plane p while rail 276 extends somewhat therebeyond. How the can reaches a centered position on a pad 126 is illustrated in Figure 8 to which reference will now be made.

With the pad in position pa and the can 116 in position ca, the can propelled by the thread is supported by the cylindrical surface 95 of the helix, by a terminal portion of rail 113, and to a slight extent by the extension 162' of the pad, and is being steadied and guided by rails 115 and 276. In position pb—cb, the support by the helix remains the same and that by the track 113 has diminished, while that by extension 162' has increased. In position pc—cc, the can has nearly left track 113 so that its support is principally derived from the helix and the pad. In positions pd—cd and pe—ce, the can has moved progressively more and more onto the pad to receive its major support therefrom, and in position pf—cf the can is in its final position on the pad with its center coinciding with the point of intersection of plane p and line 1, i. e., with the pad center 161'. The can is completely on the pad except for a slight overhang beyond edge 163, this overhang being still engaged by the thread. As most clearly indicated in Figure 8, the pitch of the helix is slightly less than the pitch of the thread so that the leading edges of the two become coincident at the point where the thread engages the fully centered can.

Thus while the supporting pads 126 travel through a certain arc at a constant level the cans are progressively slid thereon from the track 113 whose departing end is closely adjacent the path of pad travel at the beginning of said arc. The undercut rectilinear front edge of track 113 is secantial to the pad somewhat outwardly of the center 161' when the center reaches the plane p, the vertical axial plane of the screw being generally tangential to the pad at this point. Just before this point is reached, and with the container almost fully transferred to the pad, the pad is elevated somewhat, as will be later explained.

Referring to Figures 5, 17, 18, and 35, the cam track 130 has a dwell 277 followed by a rise 278 which, as here shown, starts 5° in advance of the plane p, this rise extending rather gradually for 3° beyond the plane, then rising more abruptly through 14°, and then more gradually through another 14° to a dwell 279 which extends for 219° to a fall 280 which extends for 22° to the dwell 277. In Figures 5 and 35, the follower roller 128 is on dwell 277 at the start of the rise 278 in what will be taken to be position No. 1 and the top of pad 126 is flush with the top of track 113 and with the top line or generatrix of the cylindrical surface of the helix 92, and the can 116 is closely approaching the centered position on the pad as a result of the action above described with reference to Figure 8. Also, due to the operation of the hereinbefore described cover feeding means, a cover is approaching registry with the can on ledges 257' and 258'.

Referring to Figures 5, 14 to 16 and 35, the cam track 193 includes a dwell 281 in advance of a fall 282 which starts 5° in advance of the plane p and continues for 3° beyond the plane. The fall is followed by a rise 283 which extends for 28°, easing off somewhat midway between its ends. The rise is succeeded by a dwell 284 which extends for 217° to an 8° fall 285 which terminates at the dwell 281. Thus in position No. 1 of the parts, the follower roller 191 of the knickout or pressure pad 184 is at the start of fall 282 and in this situation, the pressure pad is somewhat projected but is spaced above the can cover 243, clearance for the pad being provided by the cut-out 263 of guide plate 256.

As the rotation of shafts 54 and 61 continues, the can and cover come into registry, their centers simultaneously reaching the point of intersection of line 1 with plane p, and at this point the opposed dial pockets are directly opposite each other and gently closed on the can to assure its centering and to round it up if necessary. During the 5° of travel from position No. 1, Figure 35, to position No. 2, Figure 36, the lower chuck lifts the can so that it approaches the cover as the two come into registry, and the knockout or pressure pad is lowered so as to be slightly spaced above the cover. The bars 266 and 267 below ledges 257' and 258' guide the up moving can flange to insure that it will not catch under the ledges as the can rises.

During the next 3° of rotation of the parts, the can is additionally lifted to engage and lift the cover and the presser foot 184 is lowered to its lower limit to engage the cover which is being guided in continued registry with the can between the track ends 257' and 258' which, it will be recalled, are arcuate on the axis of the seamer shaft 54', the cover being still propelled by the nose 217 and/or the boss 207 which then pass away from the cover. As soon as the can and cover are thus engaged, which is after only 3° of travel on a gradual arc, spillage is positively prevented.

During the next 14° of rotation of the seamer shaft, the can is lifted to bring the cover against the bottom of seaming chuck 183, the knockout pad receding into the chuck recess, position No. 3, Figure 37. During the succeeding 14° of rotation, pressure is built up by the lower chuck due to the compression of its spring 146, and thereupon seaming rollers as at 286 and 287 come into action in the well known manner. Their action is finished by the time the lower chuck roller 128 reaches the fall 280 and as the roller comes onto the fall, its downward movement, and that of the lower chuck, is enforced by a fixed cam member 288, Figure 17, engaging over the projecting end 129', Figure 19, of the roller axle 129. The knockout pad roller 191 coming to fall 285 causes a yielding knockout effect on the cam and the latter is engaged by the dial H, Figure 1, and removed from the supporting pad 126 by the dial and a deflector 289.

In the embodiment which has just been described, the lower chucks 125 are directly below the supporting pads, the vertical axes of the pedestals being in substantial alignment with the centers of the supported cans. This is a preferred arrangement since it affords the most rigid support for the cans. A skeleton helix is provided in order to clear the pedestals, as has been pointed out above. In Figure 38, the helix 92a has an integral central shaft portion or core 299 and in order to clear this portion, the pedestal 125a of the lower chuck is offset from the pad 126a away from the core, having a top lateral extension 300 for the firm support of the pad.

In order to prevent the feeding of a cover when there is a gap in the line of cans propelled by the screw D, conventional means are provided and appear in Figures 1, 4 and 10. Referring to these figures, a bell crank lever 290 has an arm 291 extending in spaced relation opposite rail 115 and always engaged by a can, during the operation of a machine, when the line of cans is complete. A link 292 has one end pivoted to the other arm of the bell crank lever and is urged to the left by a spring 293. The other end of the link is pivoted to an upstanding arm 294 fixed on one end of a horizontal rock shaft 295. If a gap occurs in the line of cans, the bell crank lever is permitted to swing clockwise, Figure 1, thus rocking shaft 295 and thereby bringing a throw-out member 296 on shaft 295, Figure 10, into the path of a pawl 297 driven by shaft 225 so that the pawl is released from a ratchet 298 through which crank 224 is driven, the throw out of the pawl continuing as long as the gap in the line of cans. In the case of a single missing can, for example, the feed of a single cover is omitted and the relation of the parts is such that no cover will be delivered above the vacant pad 126.

It will be understood that the disclosure herein is intended as illustrative and that the invention is susceptible of variations in the form and arrangement of parts without departure from its scope as defined in the following claims.

I claim:

1. Apparatus for closing containers filled with liquid, without spillage, comprising a seamer turret rotatable on a vertical axis and including a plurality of equally circumferentially spaced, vertically movable container supporting pads, a container feed screw extending along a straight line with its axis disposed in parallel relation to a vertical plane tangential to the path of movement of the vertical center lines of the pads, said screw at the portion thereof adjacent the turret consisting of a skeleton helix with the spaces between the convolutions thereof being open to permit the pads to enter between said convolutions, means for rotating the screw and the turret in timed relation to transfer the containers tangentially from straight line movement with the screw to the pads for arcuate continuation of movement with the turret, means for delivering closures into vertical alignment with the containers at the point of tangency, and means for substantially immediately raising the pads and the containers into closing relation with the closures as they leave said point of tangency.

2. Container closing apparatus comprising a turret rotative on a vertical axis and including a circumferential series of equally spaced apart supporting pads each adapted during a certain arc of travel of the current to receive a filled container fed thereto in upright position, the top surfaces of said pads being at a certain level as the pads traverse said arc, means for successively feeding containers onto said pads including a horizontal screw with its axis disposed in parallel relation to a vertical plane substantially tangential to the arcuate path of travel of said pads, means for rotating said screw in coordination with said turret, said screw including a skeleton helix extending along said axis beyond the point of tangency of said plane with said arcuate path, so that during rotation of the turret and screw the pads are received between convolutions of said helix and successively receive containers propelled by said helix, and means for applying a closure to each container substantially immediately after it is received by a pad and before its direction of movement has changed substantially, thereby to avoid spilling of the container contents.

3. Container closing apparatus comprising a turret rotative on a vertical axis and including a circumferential series of equally spaced apart supporting pads each adapted during a certain arc of travel of the turret to receive a filled container fed thereto in upright position, the top surfaces of said pads being at a certain level as the pads traverse said arc, means for successively feeding containers onto said pads including a horizontal screw with its axis disposed in parallel relation to a vertical plane substantially tangential to the arcuate path of travel of the centers of said pads, means for rotating said screw in coordination with said turret, said screw including a skeleton helix extending along said axis ahead of and behind the point of tangency of said plane with said arcuate path, said helix comprising a rigid helical bar having the spaces between the convolutions thereof and the axial central portion open and unobstructed, so that during rotation of the turret and helix the pads are received between convolutions of said helix and successively receive containers propelled thereby, means disposing closures in superposed registry with containers on said pads as the turret radii of the pads successively become substantially perpendicular to said vertical plane, means for moving the closures in continued registry with the containers, and means operative immediately after initial registry of each container and closure to bring the two together by relative vertical displacement.

4. Container closing apparatus comprising a turret rotative on a vertical axis and including a circumferential series of equally spaced apart supporting pads each adapted during a certain arc of travel of the turret to receive a filled container fed thereto in upright position, the top surfaces of said pads being at a certain level as the pads traverse said arc, means for successively feeding containers onto said pads including a horizontal screw with its axis disposed in parallel relation to a vertical plane substantially tangential to the arcuate path of travel of the centers of said pads, means for rotating said screw in coordination with said turret, said screw including a skeleton helix extending along said axis beyond the point of tangency of said plane with said arcuate path with the spaces between the successive convolutions open and unobstructed, whereby during rotation of the turret and helix the pads are received between said convolutions and successively receive containers propelled by said screw, means disposing closures in superposed registry with containers on said pads as the turret radii of the pads successively become substantialy perpendicular to said vertical plane, means for moving the closures in continued registry with the containers, vertically reciprocable pedestals carried by the turret and supporting said pads respectively and received with the pads between said convolutions of the helix, a circular track supporting said pedestals and having a rise effective to elevate the pedestals to move the containers toward the registered closures for engagement therewith immediately after initial registry, and hold-down means for the closures rotating with said turret.

5. Structure according to claim 4 wherein the cam rise starts slightly in advance of the radial plane of the turret which is perpendicular to said vertical plane.

6. Container closing apparatus comprising a turret rotative on a vertical axis and including a circumferential series of equally spaced apart supporting pads each adapted during a certain arc of travel of the turret to receive a filled container fed thereto in upright position, a dial coaxial with the turret and having pockets inwardly of and above the level of said pads, the top surfaces of said pads being at a certain level as the pads traverse said arc, means for successively feeding containers onto said pads including a horizontal screw with its axis disposed in parallel relation to a vertical plane substantially tangential to the arc of travel of the centers of the pads, means for rotating said screw in coordination with said turret, said screw including a skeleton helix extending along said axis beyond the point of tangency of said plane with said arcuate path in the direction of movement of the containers, said helix having the spaces between the convolutions thereof substantially open and unobstructed, so that during rotation of the turret and helix the pads are received between convolutions of said helix and successively receive containers propelled thereby, a second dial mounted on an axis in a vertical plane including the turret axis and perpendicular to the first-mentioned vertical plane and having pockets co-operating with the pockets of the first dial, means including propelling members on said second dial for successively delivering closures above and in registry with containers on said pads as the pockets of the two dials come into opposed relation and for causing continued movement of the closures in registry with the containers as the containers go into arcuate travel on the turret, and means for relatively vertically displacing the containers and registering closures at the start of said arcuate travel to effect engagement thereof substantially immediately thereafter.

7. Container closing apparatus comprising a turret rotative on a vertical axis, a circumferential series of equally spaced apart vertically reciprocable pedestals carried by said turret, supporting pads at the upper ends of said pedestals, a circular cam track supporting said pedestals and having a rise following a dwell, a dial above said turret having pockets acting to center upright, filled containers moved laterally onto said pads, means for successively feeding containers onto said pads while said pedestals are on said dwell including a horizontal screw disposed with its axis in parallel relation to a vertical plane substantially tangential to the path of movement of the center lines of the pads, means for rotating said screw in coordination with said turret, said screw throughout a portion of its length adjacent the point of tangency of said plane with said arcuate path comprising a skeleton helix consisting of a helical bar having the spaces between the convolutions thereof and the axial central portion open and unobstructed, whereby during rotation of the turret and screw the pedestals and pads are received between convolutions of said helix and the pads successively receive containers propelled thereby, and means positioning a closure above each pad as its supporting pedestal reaches said rise and moving the closure in registry with the rising container on the pad for substantially immediate engagement by the container, before the container materially changes its direction of movement.

8. Container closing apparatus comprising a turret rotative on a vertical axis, a circumferential series of equally spaced apart vertically reciprocable pedestals carried by said turret, supporting pads at the upper ends of said pedestals, a circular cam track supporting said pedestals and having a rise following a dwell, the top surfaces of said pads being at the same level when the pedestals are on said dwell, a dial above said turret having pockets acting to center upright filled containers moved laterally onto said pads, means for successively feeding containers onto said pads while said pedestals are on said dwell including a horizontal screw disposed with its axis in parallel relation to a vertical plane substantially tangential to said turret, means for rotating said screw in coordination with said turret, said screw comprising a skeleton helix throughout the portion of the length thereof adjacent to the turret, the spaces between the convolutions of the skeleton helix being open and unobstructed, whereby during rotation of the turret and screw the pedestals and pads are received between convolutions of said helix and the pads successively receive containers propelled thereby, a second dial mounted on an axis in a vertical plane including the turret axis and perpendicular to the first-mentioned vertical plane and having pockets cooperating with the pockets of the first dial, means including propelling members on said second dial for successively delivering closures above and in registry with containers on said pads as the pockets of the two dials come into opposed relation and for causing continued movement of the closures in registry with the containers as the containers go into arcuate travel on the turret, said rise being positioned so that the pedestals are elevated thereby to engage the containers with the closures immediately after said registry is attained.

9. Apparatus according to claim 7 wherein the cam rise begins slightly before the containers and closures come into registry.

10. Container closing apparatus comprising a turret having a circumferential series of supporting pads rotatable therewith on a circular path about a vertical axis, each pad being adapted to receive a container conveyed laterally thereto in upright position, a horizontally disposed container conveying screw extending from a container receiving end toward and past the turret with its axis disposed in parallel relation to a plane tangential with respect to the said circular path, said screw including a tubular cylindrical portion extending from said receiving end toward, but terminating short of, the turret and a skeleton helix portion secured to and extending from the cylindrical portion beyond the point of tangency with the pads, a shaft supported at said receiving end and extending a substantial distance into said tubular cylindrical portion for supporting the latter at said end and at a point spaced therefrom, journal means at the remote end of the skeleton helix for supporting the same, the spaces between the convolutions of the skeleton helix being substantially open and unobstructed to receive the supporting pads as the turret and the screw rotate, for tangential transfer of the containers from the screw to the pads, and means for applying a closure to each container immediately following said point of tangential transfer.

11. An apparatus in accordance with claim 10 wherein said skeleton helix is comprised of a rigid helical bar having a helical rib projecting outwardly from its outer surface to engage the containers.

12. An apparatus in accordance with claim 10 characterized in that said skeleton helix comprises a rigid helical bar having the spaces between the convolutions thereof and the axial central portion thereof substantially open and unobstructed.

13. Structure according to claim 10 wherein the helical portion of the body includes an axial core.

14. Structure according to claim 10 wherein the turret includes vertically reciprocable pedestals which support the pads and which pedestals are in axial alignment with cans supported on the pads, and wherein the skeleton helix receives the pedestals in the spaces between the convolutions thereof.

15. Structure according to claim 10 wherein the skeleton helix of the screw includes an axial core and wherein the turret includes vertically reciprocable pedestals which support the pads and which pedestals are offset so as to clear said core.

16. Container closing apparatus comprising a turret rotative on a vertical axis and including a circumferential series of equally spaced apart supporting pads each adapted to receive a filled container laterally fed thereto in upright position, a fixed track having a horizontal top surface substantially at the level of the pads when in container receiving position and having a lateral edge the line of which is substantially tangential to the path of movement of the center lines of the pads, a guide rail above said track parallel to said edge, a screw comprising a body extending along said edge and past the turret radius which is perpendicular to the line of said edge, means for rotating said body in coordination with said turret, said screw including a radially projecting thread on said body arranged to engage appropriately spaced containers supported by said body and track and guided by said rail and to propel the containers toward said turret and successively onto said pads, each pad having a portion which is in receiving relation to a container moving off of the adjacent end of said track, that portion of said body which is adjacent said radius being in the form of an open helix between the convolutions of which the pads are received, said turret including vertically reciprocable pedestals which support the pads, a circular cam track for controlling said pedestals, and means positioning closures above and in registry with containers on the pads as the container axes intersect said radius and causing movement of the closures in registry with the containers as the latter move arcuately from said radius, said track including a dwell followed by a rise, said rise being positioned so that the pedestals are lifted to engage the containers with the closures at the start of said arcuate movement.

17. Structure according to claim 16 wherein the cam rise begins slightly in advance of the vertical plane of said radius.

JOHN SCHMIDT.

REFERENCES CITED

The following references are of record in the file of this patent:

UNITED STATES PATENTS

| Number | Name | Date |
|---|---|---|
| 652,677 | Kellington | June 26, 1900 |
| 1,151,840 | Warme | Aug. 31, 1915 |
| 1,183,654 | Krummel | May 16, 1916 |
| 1,400,391 | Thayer | Dec. 13, 1921 |
| 1,506,961 | Adkins | Sept. 2, 1924 |
| 1,601,910 | Fleischer | Oct. 5, 1926 |
| 1,621,580 | Cameron | Mar. 22, 1927 |
| 1,640,762 | Fink | Aug. 30, 1927 |
| 1,690,002 | Fink | Oct. 30, 1928 |
| 1,741,981 | Dewey | Dec. 31, 1929 |
| 1,752,912 | Kronquest | Apr. 1, 1930 |
| 1,761,591 | Ryder | June 3, 1930 |
| 1,763,458 | Coyle | June 10, 1930 |
| 1,767,965 | Coyle | June 24, 1930 |
| 1,775,888 | Christian | Sept. 16, 1930 |
| 1,989,518 | Hopkins | Jan. 29, 1935 |
| 2,032,481 | Hopkins | Mar. 3, 1936 |
| 2,109,332 | Fisher | Feb. 22, 1938 |
| 2,114,484 | Chorlton | Apr. 19, 1938 |
| 2,160,865 | Holloway | June 6, 1939 |
| 2,344,546 | Krueger | Mar. 21, 1944 |
| 2,345,870 | Guenther | Apr. 4, 1944 |
| 2,362,848 | Pearson | Nov. 14, 1944 |
| 2,469,401 | Nordquist | May 10, 1949 |